United States Patent
Du

(10) Patent No.: US 11,564,131 B2
(45) Date of Patent: Jan. 24, 2023

(54) METHOD FOR SENDING RESOURCE RESERVATION MESSAGE AND APPARATUS

(71) Applicant: HUAWEI TECHNOLOGIES CO., LTD., Guangdong (CN)

(72) Inventor: Zhenguo Du, Shenzhen (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 77 days.

(21) Appl. No.: 16/964,576

(22) PCT Filed: Jan. 22, 2019

(86) PCT No.: PCT/CN2019/072641
§ 371 (c)(1),
(2) Date: Jul. 23, 2020

(87) PCT Pub. No.: WO2019/157913
PCT Pub. Date: Aug. 22, 2019

(65) Prior Publication Data
US 2021/0037428 A1 Feb. 4, 2021

(30) Foreign Application Priority Data

Feb. 14, 2018 (CN) .......................... 201810152193.0
Jun. 29, 2018 (CN) .......................... 201810713886.2

(51) Int. Cl.
*H04W 28/26* (2009.01)
*H04W 16/28* (2009.01)
(Continued)

(52) U.S. Cl.
CPC ........... *H04W 28/26* (2013.01); *H04W 16/28* (2013.01); *H04W 72/046* (2013.01); *H04W 74/0816* (2013.01)

(58) Field of Classification Search
CPC ..... H04W 16/28; H04W 72/04; H04W 74/08; H04W 28/26; H04W 76/02
See application file for complete search history.

(56) References Cited

U.S. PATENT DOCUMENTS

2003/0152086 A1   8/2003   El Batt
2011/0007721 A1   1/2011   Taghavi Nasrabadi et al.
(Continued)

FOREIGN PATENT DOCUMENTS

CN   106576302 A   4/2017
CN   106664289 A   5/2017
(Continued)

OTHER PUBLICATIONS

Samsung,"Channel Access for NR Unlicensed Operation", 3GPP TSG-RAN WG1 Meeting #AH 1801, R1-1800478, Vancouver, Canada, Jan. 22-26, 2018, total 4 pages.
(Continued)

*Primary Examiner* — Anez C Ebrahim
(74) *Attorney, Agent, or Firm* — Womble Bond Dickinson (US) LLP

(57) ABSTRACT

A method to reduce a probability of occurrence of a hidden node in a data transmission process in a high-frequency system is disclosed. The method implemented by a communications apparatus includes determining at least one beam to be used for sending a resource reservation message, where the at least one beam includes a first beam, where a direction of the first beam is opposite to a direction of a second beam, and where the direction of the second beam is a potential transmission direction in which the communications apparatus sends information. The method further includes sending the resource reservation message by using the at least one beam, where the resource reservation message includes a resource reservation request message or a resource reservation response message, where the resource reservation
(Continued)

request message is used to request to reserve a transmission resource, and where the resource reservation response message is used to determine to reserve a transmission resource.

17 Claims, 9 Drawing Sheets

(51) Int. Cl.
*H04W 72/04* (2009.01)
*H04W 74/08* (2009.01)

(56) References Cited

U.S. PATENT DOCUMENTS

| | | | |
|---|---|---|---|
| 2011/0205969 A1 | 8/2011 | Ahmad et al. | |
| 2017/0325057 A1* | 11/2017 | Zhang | H04B 7/0695 |
| 2020/0314906 A1* | 10/2020 | Goyal | H04B 7/0695 |

FOREIGN PATENT DOCUMENTS

| | | |
|---|---|---|
| CN | 107078887 A | 8/2017 |
| WO | 2017010799 A1 | 1/2017 |
| WO | 2017151876 A1 | 9/2017 |

OTHER PUBLICATIONS

MediaTek Inc.,"Considerations on NR Unlicensed Channel Access", 3GPP TSG RAN WG1 Meeting AH 1801, R1-1800154, Vancouver, Canada, January 22-Jan. 26, 2018, total 3 pages.

* cited by examiner

METHOD FOR SENDING RESOURCE RESERVATION MESSAGE AND APPARATUS

CROSS-REFERENCE TO RELATED APPLICATIONS

This application is a national stage of International Application No. PCT/CN2019/072641, filed on Jan. 22, 2019, which claims priority to Chinese Patent Application No. 201810713886.2, filed on Jun. 29, 2018 and Chinese Patent Application No. 201810152193.0, filed on Feb. 14, 2018. All of the aforementioned applications are hereby incorporated by reference in their entireties.

TECHNICAL FIELD

This application relates to the field of communications technologies, and in particular, to a method for sending a resource reservation message and an apparatus.

BACKGROUND

With large-scale popularization of mobile intelligent terminal devices, especially emergence of services requiring large traffic, for example, videos, live broadcast, augmented reality (AR)/virtual reality (VR), and games, users impose increasingly high requirements on a rate of a mobile communications cellular network. As a wireless data service volume increases sharply, a licensed spectrum can hardly meet a communication requirement. Therefore, the 3rd generation partnership project (3GPP) Release (R) 13 and R14 introduce licensed-assisted access (LAA) and enhanced licensed-assisted access (eLAA) technologies, that is, a long term evolution (LTE) system or an LTE-advanced (LTE-A) system deployed on an unlicensed spectrum in a non-standalone (NSA) manner, to maximally utilize unlicensed spectrum resources with assistance of a licensed spectrum. Likewise, in a 5th-generation mobile communications technology (5G) new radio (NR) system, use of an unlicensed spectrum is also an indispensable technical means, referred to as NR-Unlicense (NR-U for short), to meet a service requirement and improve user experience.

Unlicensed bands, such as 2.4 GHz and 5 GHz, can be used for all of LAA, eLAA, and NR-U. However, the unlicensed bands are shared bands, and various communications systems may work on these bands. For example, systems such as wireless fidelity (Wi-Fi), Bluetooth, LAA, eLAA, and NR-U coexist on a same frequency. In addition, different communications systems may be incapable of mutual coordination. This results in quite severe interference between different communications systems or even within a same communications system, and further causes low spectrum utilization. To avoid or mitigate this problem, an international organization stipulates that a carrier listening mechanism to which a device using an unlicensed band needs to conform is a listen before talk (LBT) mechanism. In other words, the device needs to first listen to a channel before sending information. If determining, by using the LBT mechanism, that the channel is idle, the device starts to contend for the channel after an LBT process ends. For example, a device used as a sending device may send a resource reservation request message, where the resource reservation request message is used to request to send data; a device used as a receiving device may return a resource reservation response message after receiving the resource reservation request message, where the resource reservation response message is used to confirm that data can be received; and the device used as the sending device may send data after receiving the resource reservation response message.

A significant difference between NR-U and LAA/eLAA lies in that LAA/eLAA works only on a low frequency, for example, an unlicensed band below 6 GHz; however, in addition to a low frequency, NR-U may further use an unlicensed band of a high frequency, for example, an unlicensed band of 28/37/60 GHz, for communication. A system working on a low frequency already has a relatively mature LBT mechanism and a data transmission process after LBT ends. Because a frequency of a low band is not high, in other words, a wavelength is relatively large, data is usually transmitted in an omnidirectional transmission mode. However, for a high-frequency system such as NR-U, because a frequency of a high band is relatively high and a wavelength is relatively small, if data is transmitted through omnidirectional transmission, a transmission coverage area is quite small. Therefore, a beam may be used for transmission in the high-frequency system. In this case, if the LBT mechanism is also used in the high-frequency system, in the high-frequency system, for example, a sending device A determines, by using the LBT mechanism, that a channel is idle, and after an LBT process ends, the sending device A may send a resource reservation request message by using a beam. A direction of the beam is usually a potential transmission direction of the sending device A, that is, a direction in which the sending device A sends data. Therefore, another device not located in the direction of the beam cannot receive the resource reservation request message. If the another device is also performing an LBT process, the another device determines, in the LBT process, that a channel is idle, and therefore normally transmits data after the LBT process ends. However, a data transmission process of the another device may interfere with a data transmission process of the sending device A, thereby possibly causing a data transmission failure. This problem occurs because the sending device A becomes a hidden node that cannot be identified by the another device, and interferes with the data transmission process of the another device.

It can be learned that when a device in a high-frequency system starts to transmit data after performing an LBT mechanism, the data transmission of the device may fail because a hidden node exists.

SUMMARY

Embodiments of this application provide a method for sending a resource reservation message and an apparatus, to reduce a probability of occurrence of a hidden node in a data transmission process in a high-frequency system.

The embodiments provided in this application include any one of the following:

1. A transmission resource reservation method, where the method includes:

determining, by a sending device, a first direction, where the first direction includes at least a direction of a first beam, the first beam is a beam in an opposite direction of a second beam, and the second beam is a beam in a potential transmission direction in which the sending device sends data; and sending, by the sending device, a resource reservation request message in the first direction.

The sending device sends the RRQ in the direction opposite to the potential transmission direction. This helps eliminate a hidden node, thereby reducing a probability of interference and improving transmission performance.

2. The method according to Embodiment 1, where after the sending, by the sending device, the resource reservation request message in the first direction, the method includes:

sending, by the sending device, data to a receiving device in a direction of the second beam.

A purpose of sending the RRQ by the sending device is to send the data in the potential transmission direction.

3. The method according to Embodiment 3, where after the sending, by the sending device, the resource reservation request message in the first direction, and before the sending, by the sending device, data to a receiving device in a direction of the second beam, the method includes:

receiving, by the sending device in the direction of the second beam, a resource reservation response message sent by the receiving device.

The sending device receives the RRS returned by the receiving device. This indicates that a link between the two devices is smooth and the sending device can send the data to the receiving device.

4. The method according to any one of Embodiments 1 to 3, where the first direction further includes the direction of the second beam.

The RRQ sent by the sending device should be received by the receiving device, to trigger the receiving device to return the RRS. In addition, for beam transmission, the potential transmission direction and the direction opposite to the potential transmission direction are two directions that are most likely to interfere with each other. Therefore, the RRQ in the potential transmission direction can be received by the receiving device, and a hidden node can be further eliminated.

5. The method according to any one of Embodiments 1 to 3, where the first direction further includes a direction in a predefined range around the first beam.

Considering non-ideality of a component and a device, a beam range for sending the RRQ by the sending device should be properly larger than a range of a beam in an opposite direction.

6. A transmission resource reservation method, where the method includes:

receiving, by a receiving device in a direction of a third beam, a resource reservation request message sent by a sending device;

determining, by the receiving device, a second direction, where the first direction includes at least the direction of the third beam and a direction of a fourth beam, and the fourth beam is a beam in a direction opposite to the direction of the third beam; and sending, by the receiving device, a resource reservation response message in the second direction.

After receiving the RRQ, the receiving device sends the RRS in a direction opposite to a potential transmission direction of the receiving device. This helps eliminate a hidden node, thereby reducing a probability of interference and improving transmission performance.

7. The method according to Embodiment 6, where after the sending, by the receiving device, the resource reservation response message in the second direction, the method includes:

receiving, by the receiving device in the direction of the third beam, data sent by the sending device.

A purpose of performing RRQ/RRS interaction between the receiving device and the sending device is to receive, in the potential transmission direction of the receiving device, the data sent by the sending device.

8. The method according to Embodiment 6 or 7, where the second direction further includes a direction in a predefined range around the fourth beam.

Considering non-ideality of a component and a device, a beam range for sending the RRS by the receiving device should be properly larger than a range of a beam in an opposite direction.

9. A sending device, where the network device includes:

a processor, a memory, and a transceiver, where the transceiver is configured to send and receive data;

the memory is configured to store an instruction; and the processor is configured to execute the instruction in the memory, to perform the method according to any one of Embodiments 1 to 5.

10. The network device according to Embodiment 9, where the transceiver includes:

a transmitter and a receiver, where the receiver is configured to receive the resource reservation response message according to any one of Embodiments 1 to 5 that is sent by a terminal device; and the transmitter is configured to send the resource reservation request message and the data according to any one of Embodiments 1 to 5.

11. A receiving device, where the terminal device includes:

a processor, a memory, and a transceiver, where the transceiver is configured to send and receive data;

the memory is configured to store an instruction; and the processor is configured to execute the instruction in the memory, to perform the method according to any one of Embodiments 6 to 8.

12. The terminal device according to Embodiment 11, where the transceiver includes:

a transmitter and a receiver, where the receiver is configured to receive the resource reservation request message and the data according to any one of Embodiments 6 to 8 that are sent by a network device; and the transmitter is configured to send the resource reservation response message according to any one of Embodiments 6 to 8.

13. A computer program product, including a computer program, where when the computer program is executed on a computer unit, the computer unit is enabled to implement the method according to any one of Embodiments 1 to 5.

14. A computer program product, including a computer program, where when the computer program is executed on a computer unit, the computer unit is enabled to implement the method according to any one of Embodiments 6 to 8.

15. A computer program, where when the computer program is executed on a computer unit, the computer unit is enabled to implement the method according to any one of Embodiments 1 to 5.

16. A computer program, where when the computer program is executed on a computer unit, the computer unit is enabled to implement the method according to any one of Embodiments 6 to 8.

17. A network device, where the network device is configured to perform the method according to any one of Embodiments 1 to 5.

18. A terminal device, where the terminal device is configured to perform the method according to any one of Embodiments 6 to 8.

19. A computer readable storage medium, where the computer readable storage medium stores a computer program, and when the computer program is executed on a computer, the computer is enabled to implement the method according to any one of Embodiments 1 to 5.

20. A computer readable storage medium, where the computer readable storage medium stores a computer program, and when the computer program is executed on a computer, the computer is enabled to implement the method according to any one of Embodiments 6 to 8.

21. A communications system, including the terminal device according to any one of Embodiments 1 to 5, and the network device according to any one of Embodiments 6 to 8.

22. An apparatus, including a processing module and a communications interface, where the processing module is configured to perform the communication method according to any one of Embodiments 1 to 5.

The apparatus may be a chip or a chip system.

23. The apparatus according to Embodiment 22, where the apparatus further includes a storage module, the storage module is configured to store an instruction, the processing module is configured to execute the instruction stored in the storage module, and the execution of the instruction stored in the storage module enables the processing module to perform the communication method according to any one of Embodiments 1 to 5.

24. An apparatus, including a processing module and a communications interface, where the processing module is configured to perform the communication method according to any one of Embodiments 6 to 8.

The apparatus may be a chip or a chip system.

25. The apparatus according to Embodiment 24, where the apparatus further includes a storage module, the storage module is configured to store an instruction, the processing module is configured to execute the instruction stored in the storage module, and the execution of the instruction stored in the storage module enables the processing module to perform the communication method according to any one of Embodiments 6 to 8.

This application further provides any one of the following embodiments. Numbers of these embodiments have no specific correspondence with numbers of other embodiments in this application, and are merely intended for ease of description of this part.

1. A method for sending a resource reservation message, where the method includes:

determining, by a communications apparatus, at least one beam to be used for sending a resource reservation message, where the at least one beam includes a first beam, a direction of the first beam is opposite to a direction of a second beam, and the direction of the second beam is a potential transmission direction in which the communications apparatus sends information; and sending, by the communications apparatus, the resource reservation message by using the at least one beam, where the resource reservation message includes a resource reservation request message or a resource reservation response message, the resource reservation request message is used to request to reserve a transmission resource, and the resource reservation response message is used to determine to reserve a transmission resource.

The technical solution provided in this embodiment of this application may be performed after an LBT process. In this embodiment of this application, the communications apparatus may send the resource reservation request message by using the at least one beam, where the direction of the first beam included in the at least one beam is opposite to the direction of the second beam, and the direction of the second beam is the potential transmission direction in which the communications apparatus sends data. To be specific, the communications apparatus may also send the resource reservation request message in the direction opposite to the potential transmission direction of the communications apparatus. In this case, another device located in the direction opposite to the potential transmission direction of the communications apparatus can also receive the resource reservation request message sent by the communications apparatus, thereby reducing a probability that the communications apparatus becomes a hidden node of these devices. These devices may no longer contend for a channel with the communications apparatus. This increases, as much as possible, a success rate of subsequently transmitting data by the communications apparatus and the another device.

2. The method according to Embodiment 1, where the method further includes:

further sending, by the communications apparatus, the resource reservation message by using the second beam.

For example, the communications apparatus is a sending device. In this case, the sending device sends the resource reservation request message by using the second beam, so that a receiving device corresponding to the sending device may receive the resource reservation request message, to prepare for receiving data from the sending device. Alternatively, the communications apparatus is a receiving device. In this case, the receiving device sends the resource reservation response message by using the second beam, so that a sending device corresponding to the receiving device may receive the resource reservation response message, to determine that data can be sent to the receiving device.

3. The method according to Embodiment 1 or 2, where the at least one beam further includes at least one of the following beams:

a beam in a direction with an included angle greater than 0° and less than 180° from the direction of the second beam; and/or a beam in a direction with an included angle greater than 180° and less than 360° from the direction of the second beam.

In actual implementation, due to non-ideality of a component, even if a direction of an interfering beam is not directly opposite to a direction of a receiving beam, the interfering beam may still interfere with reception of the receiving beam. To resolve this problem, in this embodiment of this application, in addition to the first beam, the communications apparatus may also select the beam in the direction with the included angle greater than 0° and less than 180° from the direction of the second beam and/or the beam in the direction with the included angle greater than 180° and less than 360° from the direction of the second beam to send the resource reservation message, so as to achieve an objective of suppressing transmission of a device in a specific range around the first beam and reduce interference as much as possible.

4. The method according to Embodiment 3, where the sending, by the communications apparatus, the resource reservation message by using the at least one beam includes:

sending, by the communications apparatus, the resource reservation message by using each of the at least one beam at the same time; or sending, by the communications apparatus, the resource reservation message by using each of the at least one beam at different time.

The communications apparatus may send the resource reservation message by using each of the at least one beam at the same time. This can improve transmission efficiency, but imposes a relatively high requirement on a hardware facility of the communications apparatus. Alternatively, the communications apparatus may send the resource reservation message by using each of the at least one beam at different time. This manner imposes a relatively low requirement on the hardware facility of the communications apparatus, and helps reduce device costs.

5. The method according to any one of Embodiments 1 to 4, where the communications apparatus is a sending device, the resource reservation message is the resource reservation request message, and the method further includes:

sending, by the communications apparatus, data by using the second beam after sending the resource reservation request message.

If the communications apparatus is the sending device, in addition to the resource reservation message, the sending device further needs to send the data to a receiving device. Therefore, the communications apparatus may further send the data by using the second beam after sending the resource reservation request message, to complete data transmission.

6. The method according to any one of Embodiments 1 to 4, where the communications apparatus is a receiving device, the resource reservation message is the resource reservation response message, and before the determining, by the communications apparatus, the at least one beam, the method further includes:

receiving, by the communications apparatus, the resource reservation request message from a sending device.

If the communications apparatus is the receiving device, before sending the resource reservation response message, the receiving device is likely to first receive the resource reservation request message sent by the sending device. This is also equivalent to triggering the receiving device to send the resource reservation response message. Certainly, the receiving device may not necessarily receive the resource reservation request message sent by the sending device. Therefore, this is merely an example.

7. A communications apparatus, including:

a processor, configured to determine at least one beam to be used for sending a resource reservation message, where the at least one beam includes a first beam, a direction of the first beam is opposite to a direction of a second beam, and the direction of the second beam is a potential transmission direction in which the communications apparatus sends information; and a transceiver, configured to send the resource reservation message by using the at least one beam, where the resource reservation message includes a resource reservation request message or a resource reservation response message, the resource reservation request message is used to request to reserve a transmission resource, and the resource reservation response message is used to determine to reserve a transmission resource.

8. The communications apparatus according to Embodiment 7, where the transceiver is further configured to:

send the resource reservation message by using the second beam.

9. The communications apparatus according to Embodiment 7 or 8, where the at least one beam further includes at least one of the following beams:

a beam in a direction with an included angle greater than 0° and less than 180° from the direction of the second beam; and/or a beam in a direction with an included angle greater than 180° and less than 360° from the direction of the second beam.

10. The communications apparatus according to Embodiment 9, where the transceiver is specifically configured to:

send the resource reservation message by using each of the at least one beam at the same time; or
send the resource reservation message by using each of the at least one beam at different time.

11. The communications apparatus according to any one of Embodiments 7 to 10, where the communications apparatus is a sending device, the resource reservation message is the resource reservation request message, and the transceiver is further configured to:

send data by using the second beam after sending the resource reservation request message.

12. The communications apparatus according to any one of Embodiments 7 to 10, where the communications apparatus is a receiving device, the resource reservation message is the resource reservation response message, and the transceiver is further configured to:

receive the resource reservation request message from a sending device before the processor determines the at least one beam.

13. A communications apparatus, including:

a processing module, configured to determine at least one beam to be used for sending a resource reservation message, where the at least one beam includes a first beam, a direction of the first beam is opposite to a direction of a second beam, and the direction of the second beam is a potential transmission direction in which the communications apparatus sends information; and a transceiver module, configured to send the resource reservation message by using the at least one beam, where the resource reservation message includes a resource reservation request message or a resource reservation response message, the resource reservation request message is used to request to reserve a transmission resource, and the resource reservation response message is used to determine to reserve a transmission resource.

14. The communications apparatus according to Embodiment 13, where the transceiver module is further configured to:

send the resource reservation message by using the second beam.

15. The communications apparatus according to Embodiment 13 or 14, where the at least one beam further includes at least one of the following beams:

a beam in a direction with an included angle less than 180° from the direction of the second beam; and
a beam in a direction with an included angle greater than 180° from the direction of the second beam.

16. The communications apparatus according to Embodiment 15, where the transceiver module is specifically configured to:

send the resource reservation message by using each of the at least one beam at the same time; or
send the resource reservation message by using each of the at least one beam at different time.

17. The communications apparatus according to any one of Embodiments 13 to 16, where the communications apparatus is a sending device, the resource reservation message is the resource reservation request message, and the transceiver module is further configured to:

send data by using the second beam after sending the resource reservation request message.

18. The communications apparatus according to any one of Embodiments 13 to 16, where the communications apparatus is a receiving device, the resource reservation message is the resource reservation response message, and the transceiver module is further configured to:

receive the resource reservation request message from a sending device before the processing module determines the at least one beam.

19. A communications apparatus, where the communications apparatus includes at least one processor and a memory, and the at least one processor and the memory communicate with each other;

the memory is configured to store an instruction; and the at least one processor is configured to execute the instruction in the memory, to perform the method according to any one of Embodiments 1 to 6.

Specifically, the communications apparatus may be a chip (for example, a system on chip (SoC)) in a terminal device or a network device, so that the terminal device or the network device performs the method according to any one of Embodiments 1 to 6.

20. A communications apparatus, applied to a terminal device or a network device, where the communications apparatus is configured to perform the method according to any one of Embodiments 1 to 6. Specifically, the communications apparatus may be a chip (for example, a system on chip (SoC)) in the terminal device or the network device, so that the terminal device or the network device performs the method according to any one of Embodiments 1 to 6.

21. A computer readable storage medium, including an instruction, where when the instruction runs on a computer, the computer is enabled to perform the method according to any one of Embodiments 1 to 6.

22. A computer program product including an instruction, where when the instruction runs on a computer, the computer is enabled to perform the method according to any one of Embodiments 1 to 6.

Numbers of the foregoing embodiments have no definite correspondence with numbers of the following embodiments, and are merely intended for ease of description of this part.

In the embodiments of this application, another device located in the direction opposite to the potential transmission direction of the communications apparatus can also receive the resource reservation request message sent by the communications apparatus. Therefore, these devices may no longer contend for a channel with the communications apparatus. This increases, as much as possible, a success rate of subsequently transmitting data by the communications apparatus and the another device.

DESCRIPTION OF EMBODIMENTS

Figure 1:
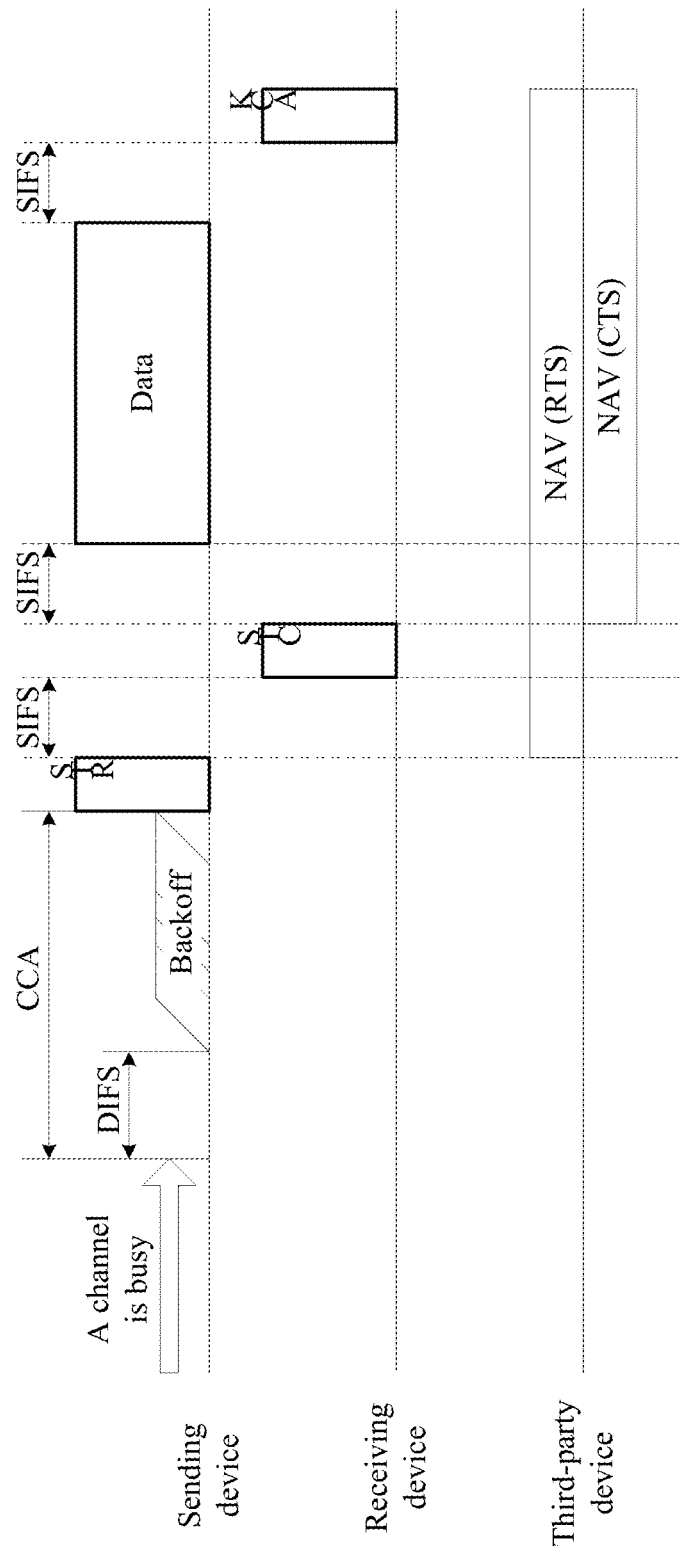
FIG. 1 is a schematic diagram of a carrier listening process in a Wi-Fi system.

To make the objectives, technical solutions and advantages of the embodiments of this application clearer, the following further describes the embodiments of this application in detail with reference to the accompanying drawings.

In the following, some terms of the embodiments of this application are described, to help a person skilled in the art have a better understanding.

(1) A terminal device may be a device that provides a user with voice and/or data connectivity, for example, may be a handheld device with a wireless connection function, or a processing device connected to a wireless modem. The terminal device may communicate with a core network through a radio access network ( ) and exchange voice and/or data with the RAN. The terminal device may be referred to as user equipment (UE), a wireless terminal device, a mobile terminal device, a subscriber unit, a subscriber station, a mobile station, a mobile console, a remote station, an access point (AP), a remote terminal device, an access terminal device, a user terminal device, a user agent, a user device, or the like. For example, the terminal device may be a mobile phone (or referred to as a "cellular" phone), a computer with a mobile terminal device, a portable, pocket-sized, handheld, computer built-in, or in-vehicle mobile apparatus, or an intelligent wearable device. For example, the terminal device may be a device such as a personal communication service (PCS) phone, a cordless telephone set, a session initiation protocol (SIP) phone, a wireless local loop (WLL) station, or a personal digital assistant (PDA). Alternatively, the terminal device may be a restricted device, for example, a device with relatively low power consumption, a device with a limited storage capability, or a device with a limited computing capability. For example, the terminal device may be an information sensing device such as a barcode, radio frequency identification (RFID), a sensor, a global positioning system (GPS), or a laser scanner.

As an example rather than a limitation, in the embodiments of this application, the terminal device may be alternatively a wearable device. The wearable device may also be referred to as a wearable intelligent device. The wearable intelligent device is a collective name of wearable devices, such as glasses, a glove, a watch, clothing, and shoes, obtained by performing intelligent design and development on daily wearables by using a wearable technology. The wearable device is a portable device that is directly put on human body or is integrated with clothing or an accessory of a user. The wearable device is not merely a hardware device, but further implements a powerful function through software support, data exchange, and cloud-based interaction. In a broad sense, wearable intelligent devices include a device that provides a complete function, has a large size, and can implement all or some functions without relying on a smartphone, for example, a smartwatch or smart glasses; and include a device that focuses only on a specific type of application function and needs to be used in combination with another device such as a smartphone, for example, various smart bands, smart helmets, and smart jewelry used for vital sign monitoring.

(2) A network device may be, for example, a base station (for example, an access point), or may be a device that is in an access network and that communicates with a wireless terminal device through one or more cells on an air interface. The network device may be configured to mutually convert a received over-the-air frame and an Internet Protocol (IP) packet and serve as a router between the terminal device and a rest portion of the access network, where the rest portion of the access network may include an IP network. The network device may also coordinate attribute management of the air interface. For example, the network device may be an evolved NodeB (NodeB or eNB or e-NodeB, evolutional Node B) in an LTE system or an LTE-A system, or may be a next generation NodeB (gNB) in a 5G NR system, or may include a centralized unit (CU) and a distributed unit (DU) in a cloud access network (CloudRAN) system. This is not limited in the embodiments of this application.

(3) Beam transmission means that a group of antennas are used for sending, and different antennas are multiplied by different weighting coefficients (which are usually complex numbers), so that signals transmitted by this group of antennas are strengthened in some directions after spatial superposition and are weakened in other directions due to signal cancellation, thereby achieving an objective of directivity transmission. Usually, the beam transmission is also referred to as beamforming or a spatial filter. In an NR standard, a beam of UE is also referred to as a spatial domain transmission/receiving filter. An uplink (UL) beam of the UE may also be described by using a sounding reference signal indicator (SRS). A downlink (DL) beam is identified by a reference signal indicator associated with the beam, for example, identified by a channel state information (CSI) reference signal resource indicator (CRI), or a synchronization signal block resource indicator (SSBRI), or a CSI-RS configuration/quasi configuration (Quasi collocation)/quasi collocation (QCL) type D/target cell identity (TCI)/link reconfiguration.

In a high-frequency communications system, the beam transmission can be used to effectively increase a transmission distance, improve transmission performance, and reduce interference with another device, and therefore has a significant advantage compared with omnidirectional transmission. A sending beam is actually used for directional transmission. An essence of the sending beam lies in its transmission direction and beam width. Generally, when transmit power is specified, a smaller beam width indicates a longer transmission distance and a stronger capability of suppressing interference from another direction. Correspondingly, a receive end may also perform directional reception by using a beam, to enhance receiving performance in a specific direction and suppress or eliminate interference from another direction. An implementation principle of a receiving beam is similar to that of the sending beam. A difference lies in that the receiving beam is used to receive a signal. The receiving beam is actually used for directional reception. An essence of the receiving beam lies in a direction and a width of the receiving beam. For ease of description, the directional sending or receiving is collectively described by using a beam in this application.

(4) Regarding a high frequency and a low frequency, the high frequency may be a band with a frequency greater than 6 GHz, and the low frequency relative to the high frequency may be a band with a frequency less than 6 GHz.

The high frequency described in this specification is mainly, for example, a band greater than 28 GHz, for example, a band of 37 GHz, a band of 60 GHz, or a band greater than 60 GHz. Certainly, the high frequency described in the embodiments of this application is not limited to these bands, and may be any band greater than 6 GHz.

In this specification, a communications system working at the high frequency is also referred to as a high-frequency communications system or a high-frequency system. For example, NR-U is a high-frequency system. In addition, a communications system working at the low frequency is referred to as a low-frequency communications system or a low-frequency system. For example, 802.11b is a low-frequency system.

(5) The terms "system" and "network" may be used interchangeably in the embodiments of this application. "Plurality" means two or more. In view of this, "plurality" may also be understood as "at least two" in the embodiments of this application. The term "and/or" describes an association relationship for describing associated objects and represents that three relationships may exist. For example, A and/or B may represent the following three cases: Only A exists, both A and B exist, and only B exists. In addition, the character "/" generally indicates an "or" relationship between the associated objects.

In addition, unless otherwise specified contrarily, ordinal numbers, such as "first" and "second", mentioned in the embodiments of this application are used to distinguish between a plurality of objects, but are not intended to limit a sequence, a time sequence, a priority, or a degree of importance of the plurality of objects.

The foregoing describes some concepts included in the embodiments of this application. The following describes a technical background of the embodiments of this application.

First, a carrier listening mechanism in a Wi-Fi system working at a band of 2.4 GHz or 5 GHz is described.

A 802.11 standard is formulated by the Institute of Electrical and Electronics Engineers (institute of electrical and electronics engineers, IEEE) 802.11 Working Group, and a business name of the 802.11 standard is Wi-Fi. 802.11b/ 802.11g works at a band of 2.4 GHz. 802.11a/802.11ac/ 802.11ax works at a band of 5 GHz. 802.11n works at bands of 2.4 GHz and 5 GHz. A carrier listening mechanism in a Wi-Fi system working at a band of 2.4 GHz is the same as that in a Wi-Fi system working at a band of 5 GHz, and specifically includes physical carrier listening and virtual carrier listening. The physical carrier listening is also referred to as clear channel assessment (CCA). To be specific, a device listens to a channel, determines whether the channel is busy or idle based on a result of comparing signal received power with a threshold, and continues to listen if the channel is busy, or starts to contend for the channel if the channel is idle. Generally, if the signal received power is greater than the threshold, a CCA result is that the channel is busy; otherwise, it is determined that the channel is idle. The virtual carrier listening is as follows: A received Wi-Fi frame is parsed, and a network allocation vector (NAV) is set based on a remaining time (which is usually carried in a duration field), carried in the Wi-Fi frame, of a transmission opportunity (TXOP). The NAV is a countdown timer maintained inside a device. Before the NAV decreases to 0, the device considers that the channel is busy and does not contend for the channel. However, when the NAV decreases to 0, a virtual carrier listening result is that the channel is idle, and the device may start to contend for the channel. Usually, the two mechanisms, namely, the physical carrier listening and the virtual carrier listening, are performed simultaneously. In other words, when the NAV is 0 and the CCA result is that the channel is idle (that is, the signal received power is less than the threshold), the device considers that the channel is idle and can contend for the channel. In any other cases, the device considers that the channel is busy and cannot contend for the channel. Unless otherwise specified, that the channel is idle means that both physical carrier listening and virtual carrier listening results are that the channel is idle.

A schematic diagram of the foregoing process is shown in FIG. 1. FIG. 1 further includes a data transmission process after carrier listening ends. When a sending device needs to send data, the sending device first performs carrier listening on a channel. When detecting, through the carrier listening, that the channel is idle for duration of a distributed coordination function interframe space (DIFS), the sending device performs a backoff process, to be specific, the sending device randomly selects a value from a preset range to set a backoff timer, and then the backoff timer starts to count down. In the backoff process, the sending device continuously performs detection on the channel. If the channel is still idle when the backoff timer decreases to 0, the sending device sends a resource reservation request message. That the sending device sends the resource reservation request message is a process performed after the carrier listening ends. The resource reservation request message is, for example, a request to send (RTS) frame, including a duration field used to indicate a remaining time of a current transmission process (that is, a TXOP), that is, duration from an end of transmission of the RTS frame to an end of the current TXOP. After receiving the RTS, a receiving device waits for duration of a short interframe space ( ) and then returns a resource reservation response message. The resource reservation response message is, for example, a clear to send (CTS) frame, also including a duration field. A value of the duration field is obtained by subtracting the SIFS and duration of the CTS from a value of the duration field in the RTS frame, that is, is equal to duration from an end of transmission of the CTS frame to an end of a current TXOP. Afterwards, after receiving the CTS frame, the sending device waits for an SIFS and then sends a data frame. After receiving the data frame, the receiving device waits for an SIFS and then sends an acknowledgement (ACK). Because both the RTS frame and the CTS frame include the duration field, a third-party device may set its own NAV based on the field after receiving the RTS or CTS. Before the NAV decreases to 0, the third-party device does not contend for the channel, thereby avoiding interference with transmission between the sending device and the receiving device when the third-party device sends data.

The foregoing describes the carrier listening mechanism in the Wi-Fi (or referred to as 802.11) system working at the low frequency, and the data transmission process after the carrier listening mechanism. Because a frequency of a low band is not high, that is, a wavelength is relatively long, in the data transmission process after the carrier listening mechanism ends, information is usually transmitted through omnidirectional transmission. However, for a high-frequency system such as NR-U, if omnidirectional transmission is used, a transmission coverage area is quite small. Therefore, transmission may be performed by using a beam in the high-frequency system. In this case, the data transmission process, after the carrier listening mechanism, that is formulated for the low band is not completely applicable to the high-frequency system.

In addition, currently, a new Wi-Fi standard is further proposed. In the new Wi-Fi standard, a Wi-Fi system works at a high frequency. For example, both 802.11ad and 802.11ay work at a band of 60 GHz (which is a high band). A carrier listening mechanism in 802.11ad and 802.11ay and a subsequent data transmission process are different from those in 802.11 working at a band of 2.4 GHz or 5 GHz (which is a low band).

Figure 2A:
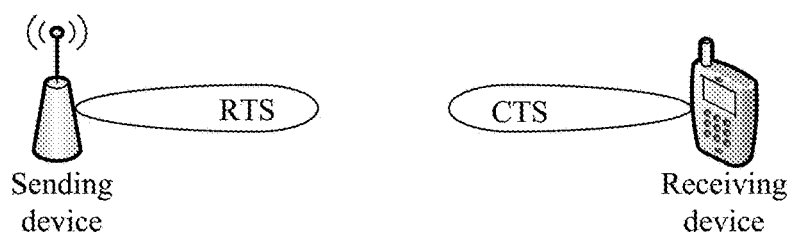
FIG. 2A is a schematic diagram of RTS/CTS transmission in 802.11ad.

In 802.11ad, omnidirectional CCA is used for physical carrier listening. That is, a device performs detection and listening on signals in all directions. This is the same as that in 802.11 working at the band of 2.4 GHz or 5 GHz. However, after the carrier listening ends, a resource reservation message (for example, RTS or CTS) is transmitted through directional transmission. To be specific, a sending device sends a resource reservation request (for example, RTS) in a potential transmission direction by using a beam, and after receiving the resource reservation request, a receiving device sends a resource reservation response (for example, CTS) in an opposite direction by using a beam, as shown in FIG. 2A. The potential transmission direction is a beam direction in which data is to be sent, for example, a beam direction in the figure that points from the sending device to the receiving device.

The 802.11ay standard is under formulation. Omnidirectional CCA may be used for physical carrier listening in the 802.11ay standard. However, there is also a proposal for using directional CCA. That is, a sending device performs physical carrier listening in a potential transmission direction by using a receiving beam. After the carrier listening ends, a resource reservation message (for example, RTS or CTS) of the sending device or a receiving device is transmitted through directional transmission. This is roughly the same as that in 802.11ad. An only difference lies in that because 802.11 ay supports multi-user transmission, a resource reservation request (for example, RTS) of the sending device may be transmitted in a plurality of potential communication directions, and different potential communication directions are corresponding to different beams and point to different receiving devices. For a resource reservation request message sent in different beam directions, the resource reservation request message is sequentially and alternately transmitted in the different beam directions through scanning, that is, is sent in a time division manner.

A disadvantage of the omnidirectional CCA is that transmission of a device is suppressed by transmission of an exposed node, thereby reducing a transmission opportunity and a system throughput. A disadvantage of directional transmission of a resource reservation message is that some surrounding hidden nodes may be unable to receive the resource reservation message transmitted through directional transmission. As a result, these hidden nodes continue to send a message or data, thereby causing interference to ongoing transmission of a sending device and reducing a system throughput. It can be learned that although 802.11ad and 802.11ay provide a high-frequency system with a solution for carrier listening and a data transmission process after the carrier listening, a disadvantage still exists.

It can be learned from the foregoing that the existing data transmission processes after the carrier listening mechanism either are inapplicable to a high-frequency system or have specific disadvantages. Actually, currently, how to implement a data transmission process after a carrier listening mechanism in NR-U has not been determined yet.

In view of this, the embodiments of this application provide an implementation of a data transmission process after a carrier listening mechanism in a high-frequency system. It should be noted that all the embodiments of this application are applicable to a communications system working at a high-frequency unlicensed band, for example, an NR-U system, a wireless local area network (WLAN) system, 802.11ay, or another communications system. In addition, directional transmission and directional reception are mostly applied to a high-frequency communications system, because a wavelength of a high-frequency signal is relatively short and therefore a device may accommodate more antennas when a device size is limited. Further, more antennas mean that a narrower beam is more likely to be implemented. In other words, directional transmission and reception are more easily implemented in a high-frequency system due to a limitation of hardware implementation. However, this does not mean that beam transmission cannot be used in a low-frequency system. Therefore, all the embodiments of this application are actually applicable to a communications system at any frequency, provided that directional transmission is used in the communications system, although an example in which the embodiments of this application are applicable to a high-frequency communications system is mainly used in the following. Further, in the future, directional transmission or reception may be alternatively implemented by a means other than a beam, and all the embodiments of this application are also applicable to a case in which directional transmission or reception is implemented by any means.

Figure 2B:
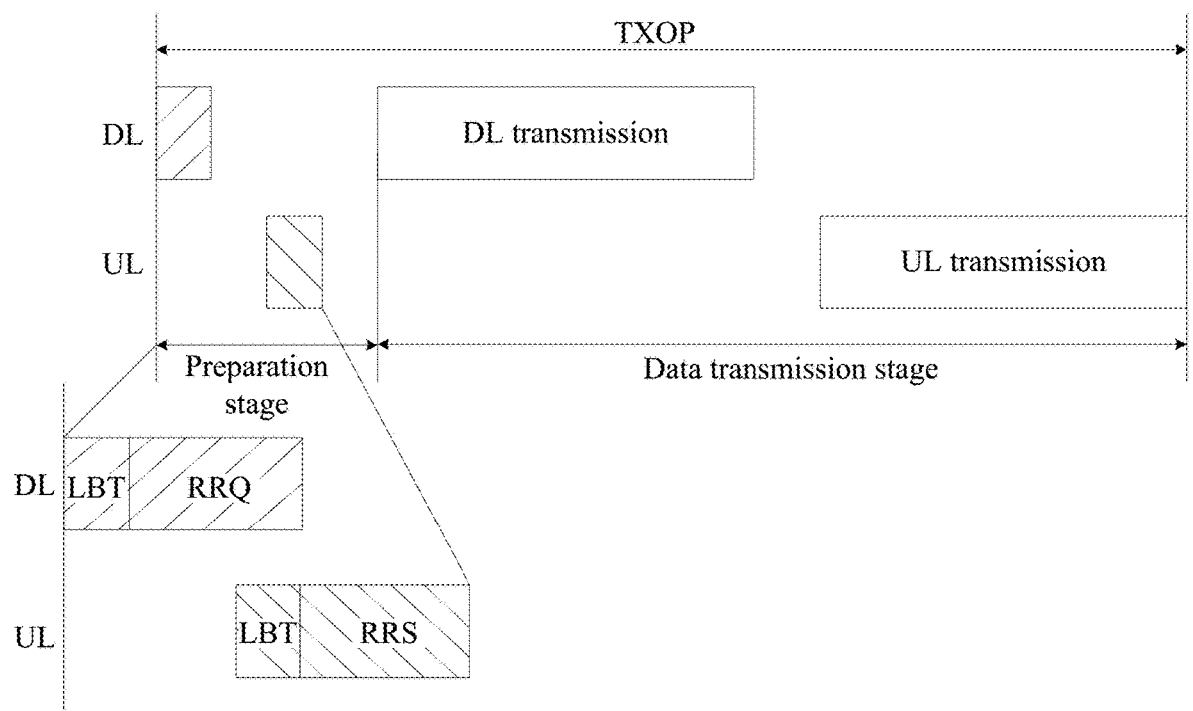
FIG. 2B is a schematic diagram of a carrier listening process in a high-frequency communications system according to an embodiment of this application.

In the embodiments of this application, an RTS/CTS mechanism (an RTS/CTS process is a data transmission process after a carrier listening mechanism, or is understood as a part of a data transmission process after a carrier listening mechanism) similar to that in 802.11 working at a low frequency is introduced in a high-frequency communications system, to reserve a channel resource. In NR-U, RTS may be also referred to as a reservation request (reservation request, RRQ), and CTS may be also referred to as a reservation response (reservation response, RRS). The RRQ and the RRS may be collectively referred to as a resource reservation message. As shown in FIG. 2B, the RRQ or RRS may include a remaining time of a current transmission process (that is, a TXOP). In FIG. 2B, DL below is a specific description of a preparation stage of DL above, and UL below is a specific description of a preparation stage of UL above. This may be understood as follows: LBT and an RRQ that are corresponding to the DL below are blocks corresponding to the DL above in the preparation stage, and therefore "/" is added to these blocks. LBT and an RRS that are corresponding to the UL below are blocks corresponding to the UL above in the preparation stage, and therefore "\" is added to these blocks. Because the blocks above are relatively small, clearer illustrations are given below. According to FIG. 2B, it can be learned that when a sending device needs to send data, the sending device first performs LBT on a channel. If determining, through the LBT, that the channel is idle, the sending device sends a resource reservation request message. The resource reservation request message is, for example, an RRQ. After receiving the RRQ, a receiving device waits for a period of duration and then performs LBT on the channel. When determining, through the LBT, that the channel is idle, the receiving device returns a resource reservation response message. The resource reservation response message is, for example, an RRS. Then a data transmission stage starts. It can be learned that a difference between a process shown in FIG. 2B and RTS/CTS in 802.11 is as follows: No LBT is required for sending CTS in 802.11, that is, before returning CTS as a response, a sending device does not need to listen to a channel or determine, based on a channel listening result, whether to send the CTS, but may directly send the CTS; however, in the process shown in FIG. 2B, LBT needs to be performed before an RRS is sent.

As described above, for a high-frequency system such as NR-U, if omnidirectional transmission is used, a transmission coverage area is quite small. Therefore, a beam may be used for transmission in the high-frequency system. In this case, in a transmission mechanism shown in FIG. 2B, an RRQ/RRS and data may be transmitted through beam transmission. However, when the beam transmission is used, a hidden node may occur, thereby causing interference to a transmission process. The following describes two scenarios in which a hidden node exists. In the following scenario descriptions, it is assumed that a transmission resource reservation mechanism is introduced in NR-U and the RRQ/RRS transmission mechanism shown in FIG. 2B is used, that is, a sending device sends an RRQ message, and a receiving device returns an RRS message. It should be noted that the receiving device may alternatively not need to return an RRS. For example, when the sending device is relatively close to the receiving device (especially when power of the sending device is greater than power of the receiving device), the receiving device may not need to return an RRS. In addition, if a device receives an RRQ/RRS sent by another device and a receiving target of the RRQ/RRS is not the device, the device should maintain a countdown timer, and before the countdown timer decreases to 0, the device should not contend for a channel or send data, to avoid interfering with the another device. The countdown timer is similar to a NAV in 802.11, and may be referred to as a resource reservation timer in the embodiments of this application.

Figure 3:
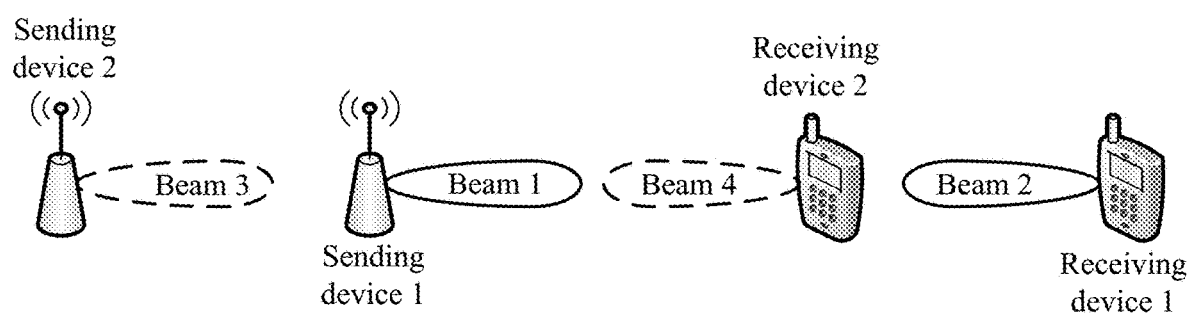
FIG. 3 is a schematic diagram of a first application scenario according to an embodiment of this application.

First Scenario:

After LBT, a sending device sends an RRQ in a potential transmission direction (that is, a transmission direction pointing from the sending device to a receiving device), and the receiving device returns an RRQ in a direction opposite to the direction. The direction in which the receiving device returns the RRQ may also be referred to as a potential transmission direction of the receiving device, that is, a transmission direction pointing from the receiving device to the sending device. As shown in FIG. 3, it is assumed that four devices are roughly located in a straight line, a sending device 1 needs to send data to a receiving device 1, and a sending device 2 needs to send data to a receiving device 2.

Transmission between the sending device 1 and the receiving device 1 starts first. The sending device 1 sends an RRQ to the receiving device 1 on a beam 1, and receives an RRS sent by the receiving device 1 by using a beam 2. Then the sending device 1 sends the data to the receiving device 1 on the beam 1. Because the sending device 1 sends the RRQ by using the beam 1 through directional transmission, the sending device 2 cannot receive the RRQ. Therefore, the sending device 2 still performs transmission to the receiving device 2. However, due to interference from the transmission of the sending device 1 on the beam 1, the receiving device 2 can hardly correctly receive the transmission of the sending device 2. Transmission of an RRQ and an RRS may be unnecessary, that is, the sending device 2 may alternatively directly transmit the data to the receiving device 2. However, due to interference from the transmission of the sending device 1 on the beam 1, apparently, the data transmission is very likely to fail. This case occurs because the RRQ sent by the sending device 1 in a directional manner cannot be received by the sending device 2 and therefore the sending device 1 becomes a hidden node of the sending device 2.

Figure 4:
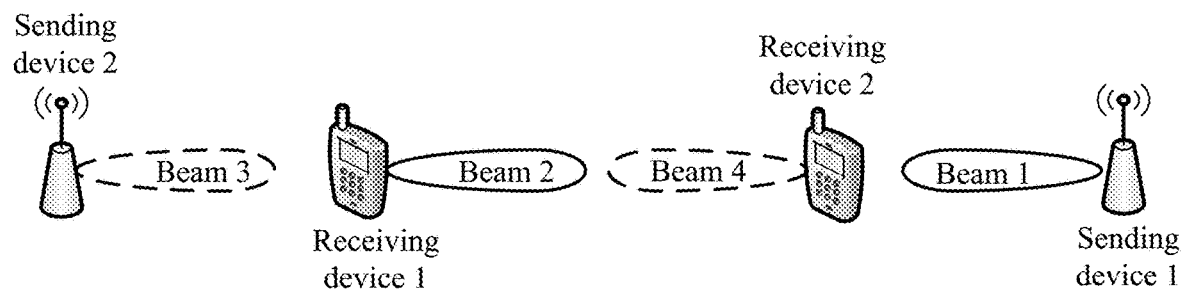
FIG. 4 is a schematic diagram of a second application scenario according to an embodiment of this application.

Second Scenario:

As shown in FIG. 4, it is assumed that four devices are roughly located in a straight line, a sending device 1 needs to send data to a receiving device 1, and a sending device 2 needs to send data to a receiving device 2.

After LBT, transmission between the sending device 1 and the receiving device 1 starts first. The sending device 1 sends an RRQ to the receiving device 1 on a beam 1, and receives an RRS sent by the receiving device 1 by using a beam 2. Then the sending device 1 sends the data to the receiving device 1 on the beam 1. Because the receiving device 1 sends the RRS to the sending device 1 by using the beam 2 through directional transmission, the RRS cannot be received by the sending device 2. Therefore, the sending device 2 still sends an RRQ or the data to the receiving device 2 by using a beam 3, and receives an RRS or a hybrid automatic repeat request (HARQ)-acknowledgement (ACK) sent by the receiving device 2 by using a beam 4. The RRS or the HARQ-ACK interferes with reception of the receiving device 1 on the beam 2. Consequently, the reception on the beam 2 is very likely to fail. This case occurs because the RRS sent by the receiving device 1 in a directional manner cannot be received by the receiving device 2 and therefore the receiving device 1 becomes a hidden node of the sending device 2.

It can be learned from the foregoing descriptions of the two scenarios that more hidden nodes may occur if beam transmission is used, thereby causing interference to a transmission process of a device or even causing a transmission failure. In view of this, with the technical solutions provided in the embodiments of this application, the problem of hidden nodes in the foregoing two scenarios can be well resolved.

In the embodiments of this application, before sending an RRQ, a sending device should first listen to a channel, and send the RRQ only when determining, based on a channel listening result, that the channel is idle. For the channel listening, an implementation method is that the sending device uses omnidirectional listening, that is, the sending device listens to signals in all directions. This method is the most conservative. A device has a few transmission opportunities, but a probability of missing a signal from a surrounding device is the lowest, and a probability of interfering with another device during transmission is also low. A second implementation method is that the sending device listens to a potential transmission direction. This method is relatively radical. A device has many transmission opportunities, but signals from some surrounding devices may be missed, thereby causing interference to ongoing transmission. A third implementation method is that the sending device listens to a direction of at least one beam. The at least one beam is defined in the following embodiment. In addition, in the third implementation method, in addition to the direction of the at least one beam, a direction to which the sending device listens may further include a potential transmission direction of the sending device. The third implementation method may be considered as a compromise between the first implementation method and the second implementation method. An implementation method used by the sending device to listen to the channel is not limited in the embodiments of this application.

In addition, before sending an RRS, a receiving device may or may not need to listen to a channel. If the receiving device needs to listen to the channel, the receiving device may also use one of the three implementation methods used by the sending device. Details are not described again. An implementation method used by the receiving device to listen to the channel is not limited in the embodiments of this application.

It should be particularly noted that for ease of description, in the embodiments of this application, sending and receiving of a same device in a same direction are described by using a same beam. For example, in FIG. 3, the sending device 1 sends an RRQ to the receiving device 1 by using the beam 1, and also receives an RRS from the receiving device 1 by using the beam 1. In other words, a sending beam and a receiving beam of a device are symmetric in directions. However, it should be understood that in an actual communications system, a sending beam and a receiving beam of a device may be asymmetric. For example, in FIG. 3, the sending device 1 may send an RRQ to the receiving device 1 by using the beam 1, and may receive an RRS from the receiving device 1 by using another beam. A direction of the another beam may be not completely consistent with that of the beam 1.

Further, it should be particularly noted that when a diversity or multiple-input multiple-output (multiple-input multiple-output, MIMO) technology is used for data transmission, a plurality of physical beams may be included in a potential transmission direction of a sending device. For example, in FIG. 3 or FIG. 4, when the sending device 1 transmits the data by using the beam 1, the beam 1 may include a plurality of physical beams. Directions of these beams are roughly consistent, that is, are all roughly the same as a direction of the beam 1.

In addition, it should be noted that the "sending device" and the "receiving device" described in the embodiments of this application each are a type of communications apparatus, that is, a communications apparatus may be a sending device, or may be a receiving device. In addition, the "sending device" may be understood as a device that sends data, and the "receiving device" may be understood as a device that receives data. It can be learned that concepts such as the "sending device" and the "receiving device" are merely relative concepts, but not absolute. For example, a same device may be referred to as a receiving device when receiving data, or may be referred to as a sending device when sending data.

The resource reservation message mentioned in this specification may include a resource reservation request message or a resource reservation response message. The resource reservation request message is used to request to reserve a transmission resource. The resource reservation response message is used to determine to reserve a transmission resource.

Figure 5:
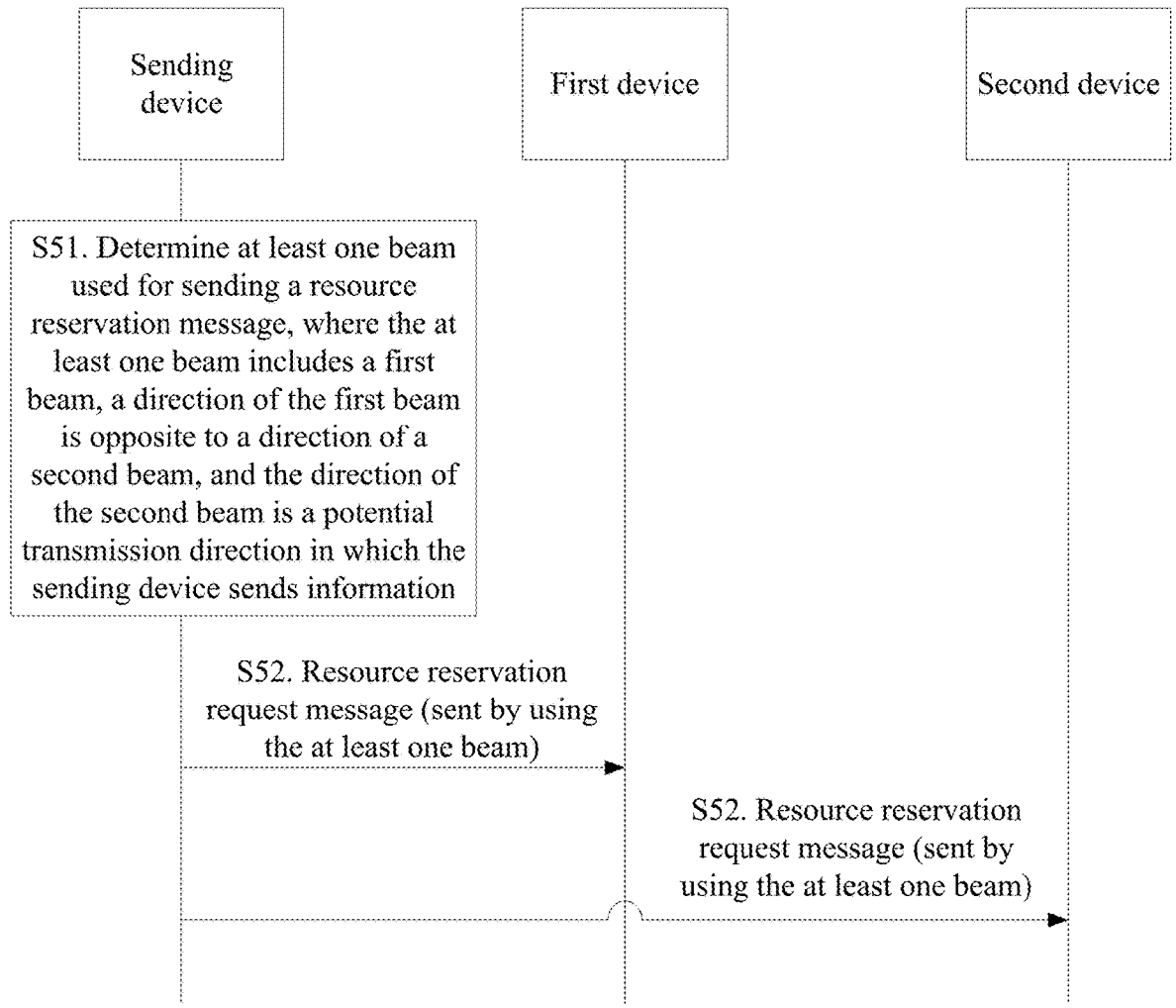
FIG. 5 is a flowchart of a first method for sending a resource reservation message according to an embodiment of this application.

FIG. 5 is a flowchart of a first method for sending a resource reservation message according to an embodiment of this application. The method may be used to resolve the technical problem existing in the scenario shown in FIG. 3. The method may be performed by a communications apparatus. In this embodiment, the communications apparatus is used as a sending device. Therefore, this may also be understood as that the method may be performed by a receiving device and a communications apparatus. Certainly, the sending device may also be understood as a type of communications apparatus. Therefore, this may also be understood as that the method is performed by a communications apparatus used as a sending device and a communications apparatus used as a receiving device. The technical problem existing in the scenario shown in FIG. 4 is resolved in another embodiment below.

S51. A sending device determines at least one beam to be used for sending a resource reservation message, where the at least one beam includes a first beam, a direction of the first beam is opposite to a direction of a second beam, and the direction of the second beam is a potential transmission direction in which the sending device sends information.

S52. The sending device sends the resource reservation message by using the at least one beam, and a device in a direction of the at least one beam receives the resource reservation message.

In this embodiment, the resource reservation message includes a resource reservation request message used to request to reserve a transmission resource.

A first device and a second device in FIG. 5 may be considered as devices that can receive the resource reservation request message. For example, the first device and the second device are devices in directions of two of the at least one beam. Alternatively, for example, the first device is a device in a direction of one of the at least one beam, where the beam is, for example, the first beam, and the second device is a device in the direction of the second beam. This is not specifically limited. In addition, FIG. 5 merely shows an example in which the two devices can receive the resource reservation request message. Actual application is not limited thereto.

The sending device in this embodiment is, for example, the sending device 1 in the scenario shown in FIG. 3, or certainly, may be the sending device 2 in the scenario shown in FIG. 3. This is not limited in this embodiment. Alternatively, this embodiment may be applied to another scenario, for example, may be applied to the scenario shown in FIG. 4. In this case, the sending device in this embodiment is, for example, the sending device 1 or the sending device 2 in the scenario shown in FIG. 4.

The direction of the second beam is the potential transmission direction in which the sending device sends information. The "information" herein may be "data". In other words, the direction of the second beam may be the potential transmission direction in which the sending device sends data, or may be understood as a direction pointing from the sending device to a receiving device. Using an example in which the sending device is the sending device 1, the direction of the second beam is a direction pointing from the sending device 1 to the receiving device 1. In this case, the direction of the first beam included in the at least one beam is opposite to the direction of the second beam. The direction of the first beam may be exactly opposite to the direction of the second beam. For example, an included angle between the direction of the first beam and the direction of the second beam is 180°. An included angle between a direction of a beam and a direction of another beam may be an angle formed after the another beam rotates along a counterclockwise direction and reaches a location in which the another beam overlaps the beam. For example, the included angle between the direction of the first beam and the direction of the second beam may be an angle formed after the second beam rotates along a counterclockwise direction so that the first beam overlaps the second beam. For example, that the included angle between the direction of the first beam and the direction of the second beam is 180° may be understood as that the second beam overlaps the first beam after the second beam rotates along the counterclockwise direction for 180°. Certainly, an included angle between directions of two beams may be alternatively understood in a clockwise manner. In this case, an included angle between a direction of a beam and a direction of another beam may be an angle formed after the another beam rotates along a clockwise direction and reaches a location in which the another beam overlaps the beam. For example, the included angle between the direction of the first beam and the direction of the second beam may be an angle formed after the second beam rotates along a clockwise direction so that the first beam overlaps the second beam. For example, that the included angle between the direction of the first beam and the direction of the second beam is 180° may be understood as that the second beam overlaps the first beam after the second beam rotates along the clockwise direction for 180°.

Theoretically, the sending device no longer becomes a hidden node of a device located in a direction opposite to the direction of the second beam, provided that the sending device determines the first beam, where the included angle between the direction of the first beam and the direction of the second beam is 180°, and the sending device sends the resource reservation request message by using the first beam. For example, referring to FIG. 6, a sending device 1 determines a first beam. An included angle between a direction of the first beam and a direction of a second beam is 180°. For example, the first beam is a beam 5 in FIG. 6. The sending device 1 sends an RRQ on the beam 5. The beam 5 points to a sending device 2. Therefore, the sending device 2 can receive the RRQ sent by the sending device 1, and the sending device 2 no longer performs sending to a receiving device 2, thereby eliminating a hidden node.

Figure 7A:
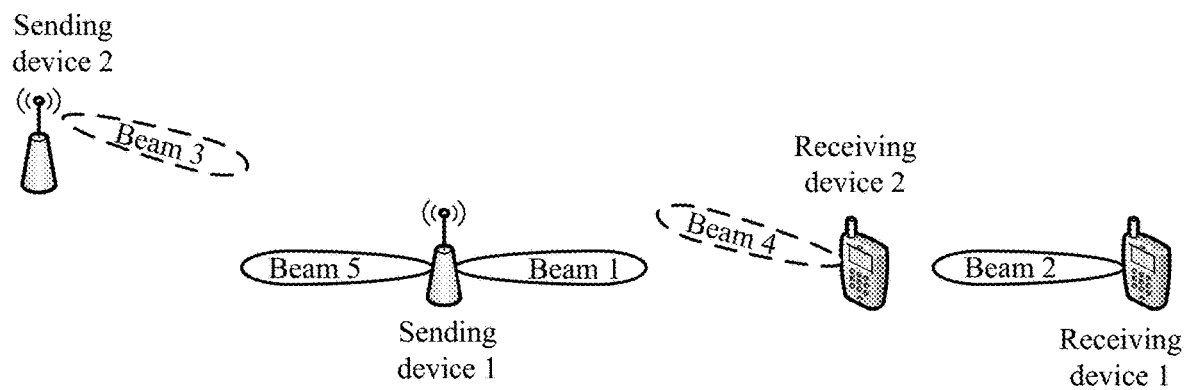
FIG. 7A is a schematic diagram of performing transmission in a first application scenario according to a first method for sending a resource reservation message according to an embodiment of this application.

However, in actual implementation, due to non-ideality of a component, even if a direction of an interfering beam is not directly opposite to a direction of a receiving beam, the interfering beam may still interfere with reception of the receiving beam. For example, in a case shown in FIG. 7A (a transmission scenario in FIG. 7A is the same as that in FIG. 3), although a direction of a beam 1 is not directly opposite to a direction of a beam 4, sending of the beam 1 still interferes with the beam 4 due to side lobe leakage or another cause. According to the solution provided in this embodiment of this application, if the sending device determines only one first beam and an included angle between a direction of the first beam and a direction of a second beam is 180°, for example, the first beam is a beam 5 in FIG. 7A and a sending device 1 sends an RRQ on the beam 5, because the beam 5 does not point to a sending device 2, the sending device 2 cannot receive the RRQ sent by the sending device 1 (but the sending device 2 may detect an interfering signal leaked by the beam 5), and therefore the sending device 2 still performs sending to a receiving device 2. However, due to interference from the beam 1, reception of the receiving device 2 can hardly succeed, thereby wasting transmission resources.

For the foregoing problem, in this embodiment of this application, the sending device may further select a beam in a direction with an included angle less than 180° from the direction of the second beam and/or a beam in a direction with an included angle greater than 180° from the direction of the second beam. In other words, in this embodiment, in addition to the first beam, the at least one beam may further include at least one of the following beams:

a beam in a direction with an included angle greater than 0° and less than 180° from the direction of the second beam; and/or a beam in a direction with an included angle greater than 180° and less than 360° from the direction of the second beam.

In other words, in addition to the first beam in the direction exactly opposite to the direction of the second beam, the at least one beam determined by the sending device may further include a beam in a direction roughly opposite to the direction of the second beam. For example, the direction with the included angle greater than 0° and less than 180° from the direction of the second beam and/or the direction with the included angle greater than 180° and less than 360° from the direction of the second beam may be considered as being roughly opposite to the direction of the second beam.

Figure 7B:
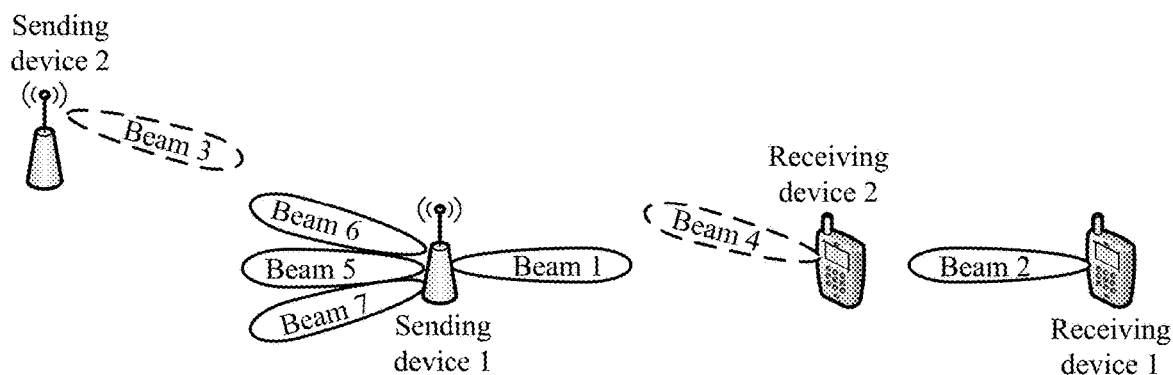
FIG. 7B is a schematic diagram of performing transmission in a first application scenario according to a first method for sending a resource reservation message according to an embodiment of this application.

As shown in FIG. 7B, for example, the at least one beam determined by the sending device includes a beam 5, a beam 6, and a beam 7. The beam 5 is the first beam in a direction with an included angle of 180° from the direction of the second beam. The beam 6 is a beam in a direction with an included angle less than 180° from the direction of the second beam. The beam 7 is a beam in a direction with an included angle greater than 180° from the direction of the second beam. In this case, a sending device 1 not only sends an RRQ in a direction of the beam 5, but also sends the RRQ on the beam 6 and the beam 7. The beam 6 and the beam 7 are adjacent to the beam 5 in directions. In this way, a device (for example, a sending device 2 in FIG. 7B) in a specific range around the direction of the beam 5 can receive the RRQ sent by the sending device 1, thereby achieving an objective of suppressing transmission of the device.

In addition, the foregoing uses an example in which a beam included in the at least one beam is considered as a separate beam. For example, in FIG. 7B, the beam 5 to the beam 7 are considered as three separate beams. In addition to this manner of understanding, the at least one beam may also be considered as a wide beam in this embodiment. For example, the beam 5 to the beam 7 in FIG. 7B may be considered as one wide beam. The sending device may transmit the RRQ by using the wide beam. In this embodiment, if a beam included in the at least one beam is considered as a separate beam, each of the at least one beam may have a same angular width that may be equal to an angular width of the second beam. Certainly, each of the at least one beam may alternatively have a different angular width, and some beams may have a same angular width as the second beam, or none of the at least one beam has a same angular width as the second beam. An angular width of each of the at least one beam may be predefined by a standard, or may be determined by the sending device itself, or may be stipulated as being related to the angular width of the second beam, for example, may be obtained based on the angular width of the second beam. This is not specifically limited. However, if the at least one beam is considered as a wide beam, an angular width of the wide beam may be greater than the angular width of the second beam. The angular width of the wide beam may be predefined by a standard, or may be determined by the sending device itself, or may be stipulated as being related to the angular width of the second beam, for example, may be obtained based on the angular width of the second beam. This is not specifically limited.

After determining the at least one beam, the sending device may send the resource reservation request message by using the at least one beam. The resource reservation request message is, for example, an RRQ. In this case, all devices located in the direction of the at least one beam can receive the RRQ sent by the sending device. For a case in which each beam included in the at least one beam is considered as a separate beam, the sending device may send the RRQ by using each of the at least one beam at the same time. This can improve transmission efficiency, but imposes a relatively high requirement on a hardware facility of the sending device. Alternatively, the sending device may send the RRQ by using each of the at least one beam at different time. For example, the sending device first sends the RRQ by using one of the at least one beam, and after sending by using the beam is completed, sends the RRQ by using another one of the at least one beam. This manner requires a relatively long transmission time, but imposes a relatively low requirement on the hardware facility of the sending device and helps reduce costs. A specific sending manner in which the sending device sends the resource reservation request message by using the at least one beam may be predefined by a protocol or may be selected by the sending device itself, or specific sending manners may be fixed for different sending devices. This is not limited in this embodiment.

After receiving the RRQ sent by the sending device, a device in the direction of the at least one beam knows that the sending device is to transmit data. In this case, the device in the direction of the at least one beam no longer performs transmission in a specific period of time, thereby reducing a possibility of a data transmission failure of the device in the direction of the at least one beam due to the transmission of the sending device. This reduces a waste of resources and also improves a data transmission success rate. It can be considered that for the device in the direction of the at least one beam, the sending device is no longer a hidden node, thereby eliminating a hidden node and ensuring, as much as possible, that data transmission of the sending device and another device can succeed.

In addition, in this embodiment, in addition to sending the resource reservation request message by using the at least one beam, the sending device may further send the resource reservation request message by using the second beam. In other words, the sending device may choose to send the resource reservation request message by using the at least one beam, or may choose to send the resource reservation request message by using the at least one beam and the second beam. Certainly, the sending device may alternatively choose to send the resource reservation request message by using only the second beam. The sending device sends the resource reservation request message by using the second beam, so that a receiving device corresponding to the sending device may receive the resource reservation request message, to prepare for receiving data from the sending device. The receiving device corresponding to the sending device is a receiving device that needs to receive data sent by the sending device. Using FIG. 3 as an example, if the sending device is the sending device 1, a receiving device corresponding to the sending device 1 is the receiving device 1 in FIG. 3.

If the sending device sends the resource reservation request message by using the at least one beam and the second beam and the resource reservation message is, for example, an RRQ, the sending device may send the RRQ by using the second beam and each of the at least one beam at the same time. This can improve transmission efficiency, but imposes a relatively high requirement on a hardware facility of the sending device. Alternatively, the sending device may send the RRQ by using the at least one beam and the second beam at different time. For example, the sending device first sends the RRQ by using one of the at least one beam; after sending by using the beam is completed, sends the RRQ by using another one of the at least one beam, and so on; and after all sending by using the at least one beam is completed, sends the RRQ by using the second beam. Alternatively, the sending device sends the RRQ by using the second beam; after sending by using the second beam is completed, first sends the RRQ by using one of the at least one beam; and after sending by using the beam is completed, sends the RRQ by using another one of the at least one beam, and so on. This manner requires a relatively long transmission time, but imposes a relatively low requirement on the hardware facility of the sending device and helps reduce costs. Specifically, if the sending device sends the resource reservation request message by using the at least one beam and the second beam, a sending manner used by the sending device may be predefined by a protocol or may be selected by the sending device itself, or specific sending manners may be fixed for different sending devices. This is not limited in this embodiment.

In addition, after sending the resource reservation request message, the sending device may further send data to the receiving device by using the second beam. Before the sending device sends the data to the receiving device, the receiving device may send an RRS to the sending device. In this case, the sending device receives the RRS from the receiving device. After receiving the RRS, the sending device sends the data to the receiving device. However, the receiving device may alternatively not send the RRS to the sending device. For example, the receiving device does not receive the resource reservation request message sent by the sending device, or the receiving device receives the resource reservation request message sent by the sending device but fails to transmit the RRS, or the receiving device receives the resource reservation request message sent by the sending device but the receiving device does not send the RRS to the sending device. In these cases, the sending device may not receive the RRS sent by the receiving device, but the sending device may still send data to the receiving device.

In this embodiment of this application, the sending device may send the resource reservation request message in the direction opposite to the potential transmission direction. In this case, another device located in the direction opposite to the potential transmission direction of the sending device can also receive the resource reservation request message. Therefore, these devices may no longer contend for a channel with the sending device. This increases, as much as possible, a success rate of subsequently sending data by the sending device, and also reduces a probability of failing to send data by these devices. This is equivalent to reducing a possibility that the sending device becomes a hidden node of these devices.

Alternatively, the embodiment shown in FIG. 5 may be understood as follows:

determining, by a sending device, a first direction, where the first direction includes at least a direction of a first beam, the first beam is a beam in an opposite direction of a second beam, and the second beam is a beam in a potential transmission direction in which the sending device sends data; and sending, by the sending device, a resource reservation request message in the first direction.

That is, determining at least one beam by the sending device may also be understood as determining the first direction by the sending device, and the direction of the first beam in the at least one beam may be understood as the direction of the first beam that is included in the first direction.

Figure 6:
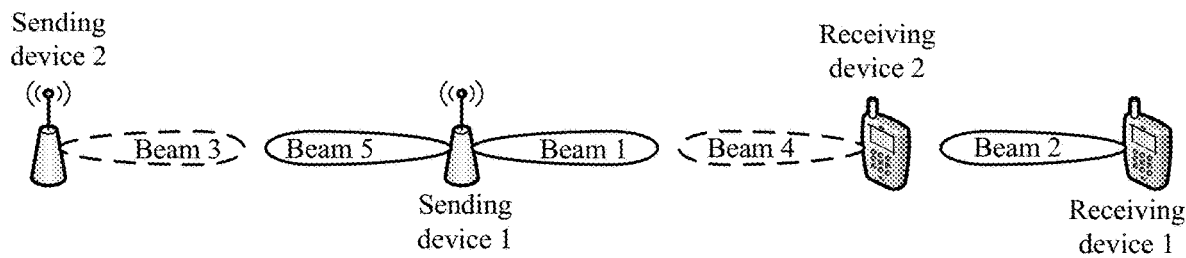
FIG. 6 is a schematic diagram of performing transmission in a first application scenario according to a first method for sending a resource reservation message according to an embodiment of this application.

For example, in the scenario shown in FIG. 3, the direction of the beam 1 is a potential transmission direction of the sending device 1, and the beam 1 may be understood as the second beam. When sending an RRQ, the sending device 1 performs sending in the first direction. The first direction includes at least a direction of a beam 5, as shown in FIG. 6. In an implementation, the first direction includes only the direction of the beam 5, that is, the first direction includes only the direction of the first beam. In this case, the sending device 1 performs sending only in the direction of the beam 5 (that is, the sending device 1 does not perform sending in the direction of the beam 1). To be specific, the sending device 1 sends the resource reservation request message only on the at least one beam, but does not send the resource reservation request message on the second beam. In another implementation, the first direction includes the direction of the beam 1 and the direction of the beam 5. In this case, the sending device 1 performs sending in both the directions of the beam 1 and the beam 5. That is, the first direction includes the direction of the first beam and the direction of the second beam. In this case, the sending device 1 sends the resource reservation request message on both the second beam and the first beam in the at least one beam. Specifically, the sending device 1 may simultaneously send an RRQ in the directions of the beam 1 and the beam 5. This imposes a relatively high requirement on hardware of the sending device 1. Alternatively, the sending device 1 may sequentially send an RRQ in the directions of the two beams: the beam 1 and the beam 5. For example, the sending device 1 first performs sending in the direction of the beam 1, and then performs sending in the direction of the beam 5. This imposes a relatively low requirement on the hardware of the sending device 1, and helps reduce costs. In this embodiment, a width of the potential transmission direction (for example, the direction of the beam 1) may be equal to a width of the first direction (for example, the direction of the beam 5), that is, a width of the second beam may be equal to a width of each of the at least one beam. Alternatively, the width of the second beam is different from the width of each of the at least one beam. Alternatively, the width of the second beam is equal to a width of some of the at least one beam.

After sending the resource reservation request message in the first direction, the sending device may further send data to a receiving device in the direction of the second beam, that is, send the data to the receiving device by using the second beam. In addition, after the sending device sends the resource reservation request message in the first direction, and before the sending device sends the data to the receiving device in the direction of the second beam, the sending device may further receive, in the direction of the second beam, a resource reservation response message sent by the receiving device. That is, after receiving the resource reservation request message, the receiving device may send the resource reservation response message to the sending device. Certainly, the receiving device may alternatively not send the resource reservation response message to the sending device. Alternatively, the receiving device sends the resource reservation response message, but the sending device does not receive the resource reservation response message. This is not specifically limited.

Likewise, considering non-ideality of a component, namely, the problem shown in FIG. 7A, the sending device sends the RRQ in the first direction, where the first direction includes a direction opposite to the potential transmission direction of the sending device. In this embodiment, "the direction opposite to the potential transmission direction of the sending device" not only includes a direction of a beam (which may also be referred to as a reverse beam of the sending device, namely, the first beam) opposite to a direction of a potential transmission beam of the sending device, but also includes a direction of a beam around the reverse beam. In other words, in addition to the direction of the first beam, the first direction further includes a direction in a predefined range around the first beam. That is, the at least one beam determined by the sending device not only includes the first beam, but also may include a beam in a direction with an included angle less than 180° from the direction of the second beam and/or a beam in a direction with an included angle greater than 180° from the direction of the second beam. As shown in FIG. 7B, the sending device 1 not only sends the RRQ in the direction of the beam 5, but also sends the RRQ on the directions of the beam 6 and the beam 7. The beam 6 and the beam 7 are adjacent to the beam 5 in directions. In this way, a device (for example, the sending device 2) in a specific range around the direction of the beam 5 can receive the RRQ sent by the sending device 1, thereby achieving an objective of suppressing transmission of the device. Similar to the case shown in FIG. 6, the sending device 1 may or may not send the RRQ in the direction of the beam 1. The sending device 1 may simultaneously send the RRQ in the direction of the beam 1 (if sending is performed) and the directions of the beam 5 to the beam 7. This imposes a relatively high requirement on the hardware of the sending device 1. Alternatively, the sending device 1 may sequentially send the RRQ in the directions of these beams. For example, the sending device 1 first performs sending in the direction of the beam 1, and then sequentially performs sending in the directions of the beam 5 to the beam 7. In addition, the directions of the beam 5 to the beam 7 may be alternatively combined, and the beam 5 to the beam 7 are considered as one wide beam. The RRQ is transmitted by using the wide beam. In this embodiment, an angular width of the potential transmission direction (for example, the beam 1) may be less than an angular width of the beam 5 to the beam 7. A specific value of an angular width of the first direction may be predefined by a standard, or may be determined by the sending device, or may be a function of the potential transmission direction.

With the foregoing embodiment shown in FIG. 5, the technical problem existing in the scenario shown in FIG. 3 is resolved. The following further describes another embodiment. The embodiment may be used to resolve the technical problem existing in the scenario shown in FIG. 4.

Figure 8:
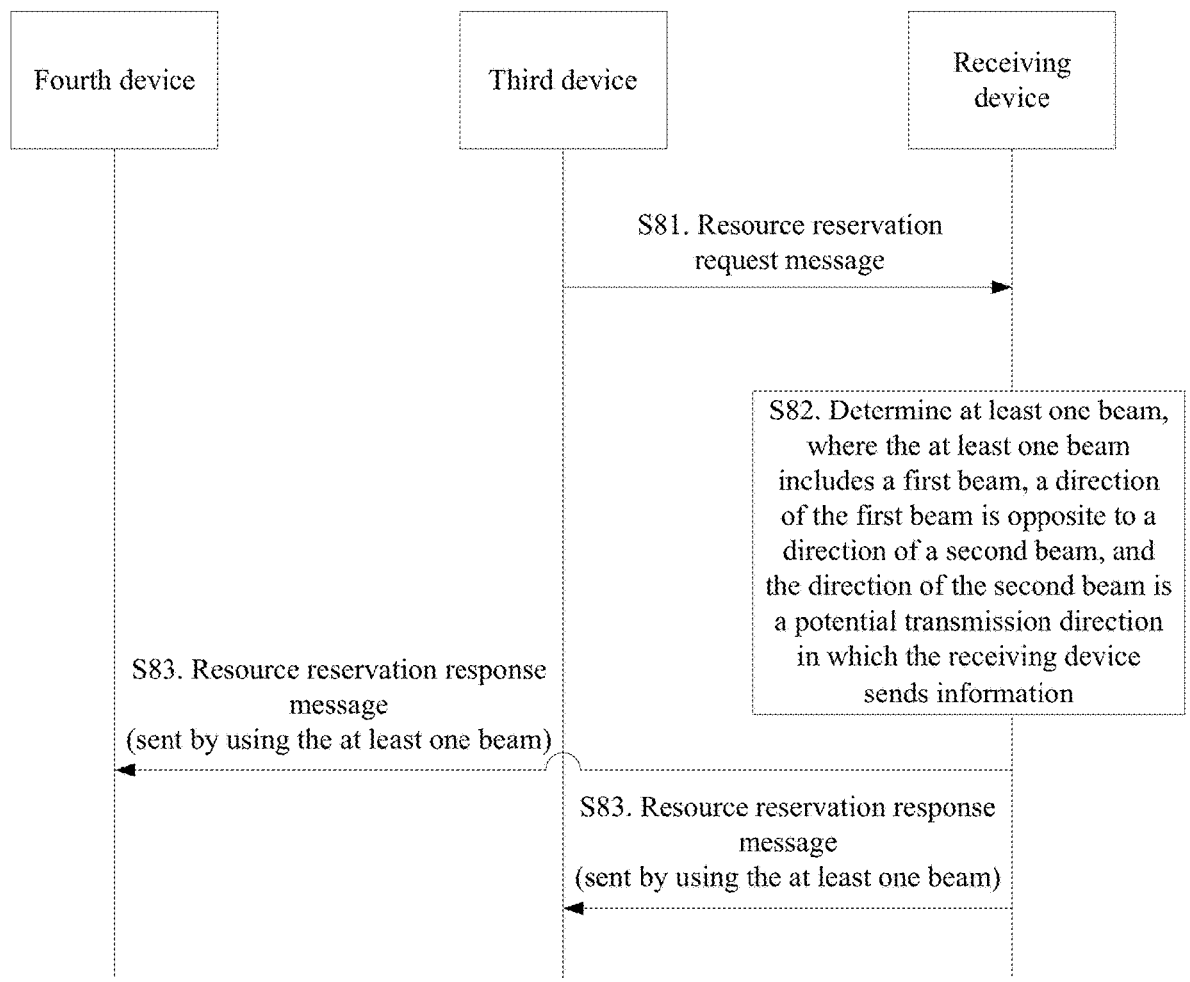
FIG. 8 is a flowchart of a second information sending method according to an embodiment of this application.

Referring to FIG. 8, an embodiment of this application provides a second method for sending a resource reservation message. The method may be used to resolve the technical problem existing in the scenario shown in FIG. 4. The method may be performed by a communications apparatus. In this embodiment, the communications apparatus is used as a receiving device. Therefore, this may also be understood as that the method may be performed by a sending device and a communications apparatus. Certainly, the sending device may also be understood as a type of communications apparatus. Therefore, this may also be understood as that the method is performed by a communications apparatus used as a sending device and a communications apparatus used as a receiving device. A procedure of the method is described as follows:

S81. A sending device sends a resource reservation request message to a receiving device, and the receiving device receives the resource reservation request message from the sending device.

S82. The receiving device determines at least one beam, where the at least one beam includes a first beam, a direction of the first beam is opposite to a direction of a second beam, and the direction of the second beam is a potential transmission direction in which the receiving device sends information.

S83. The receiving device sends a resource reservation message by using the at least one beam, and a device in a direction of the at least one beam receives the resource reservation message.

In this embodiment, the resource reservation message includes a resource reservation response message used to determine to reserve a transmission resource.

The receiving device in this embodiment is, for example, the receiving device 1 in the scenario shown in FIG. 4, or certainly, may be the receiving device 2 in the scenario shown in FIG. 4. This is not limited in this embodiment. Alternatively, this embodiment may be applied to another scenario, for example, may be applied to the scenario shown in FIG. 3. In this case, the receiving device in this embodiment is, for example, the receiving device 1 or the receiving device 2 in the scenario shown in FIG. 3.

The direction of the second beam is the potential transmission direction in which the receiving device sends information. The "information" herein is, for example, the resource reservation response message. That is, a second direction is a direction pointing from the receiving device to the sending device. Using an example in which the receiving device is the receiving device 1, the direction of the second beam is a direction pointing from the receiving device 1 to the sending device 1. In this case, the direction of the first beam included in the at least one beam is opposite to the direction of the second beam. The direction of the first beam may be exactly opposite to the direction of the second beam. For example, an included angle between the direction of the first beam and the direction of the second beam is 180°. For understanding of an included angle between directions of beams, refer to the related descriptions in the embodiment shown in FIG. 5.

Theoretically, the receiving device no longer becomes a hidden node of a device located in a direction opposite to the direction of the second beam, provided that the receiving device determines the first beam, where the included angle between the direction of the first beam and the direction of the second beam is 180°, and the receiving device sends the resource reservation response message by using the first beam. For example, referring to FIG. 9, the at least one beam includes a first beam. An included angle between a direction of the first beam and a direction of a second beam is 180°. For example, the first beam is a beam 5 in FIG. 9. A receiving device 1 sends an RRS on the beam 5. The beam 5 points to a sending device 2. Therefore, the sending device 2 can receive the RRS sent by the receiving device 1, and the sending device 2 does not send a message or data to a receiving device 2, thereby eliminating a hidden node.

Figure 10A:
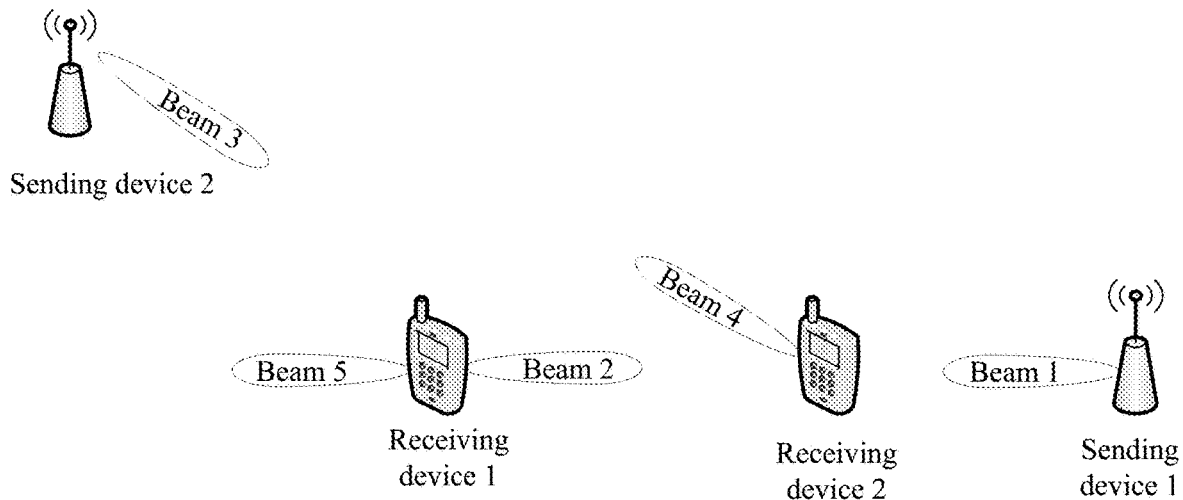
FIG. 10A is a schematic diagram of performing transmission in a second application scenario according to a second method for sending a resource reservation message according to an embodiment of this application.

However, similar to the foregoing embodiment, in actual implementation, due to non-ideality of a component, even if a direction of an interfering beam is not directly opposite to a direction of a receiving beam, the interfering beam may still interfere with reception of the receiving beam. For example, in a case shown in FIG. 10A (a transmission scenario in FIG. 10A is the same as that in FIG. 4), although a direction of a beam 2 is not directly opposite to a direction of a beam 4, sending of the beam 4 still interferes with the beam 2 due to side lobe leakage or another cause. According to the solution provided in this embodiment of this application, if the at least one beam includes only one first beam and an included angle between a direction of the first beam and a direction of a second beam is 180°, for example, the first beam is a beam 5 in FIG. 10A and a receiving device 1 sends an RRS on the beam 5, because the beam 5 does not point to a sending device 2, the sending device 2 cannot receive the RRS sent by the receiving device 1 (but the sending device 2 may detect an interfering signal leaked by the beam 5), and therefore the sending device 2 still performs sending to a receiving device 2. This may interfere with receiving data by the receiving device 1 by using the beam 2.

For the foregoing problem, in this embodiment of this application, the receiving device may further select a beam in a direction with an included angle less than 180° from the direction of the second beam and/or a beam in a direction with an included angle greater than 180° from the direction of the second beam. In other words, in this embodiment, in addition to the first beam, the at least one beam may further include at least one of the following beams:

a beam in a direction with an included angle greater than 0° and less than 180° from the direction of the second beam; and/or a beam in a direction with an included angle greater than 180° and less than 360° from the direction of the second beam.

In other words, in addition to the first beam in the direction exactly opposite to the direction of the second beam, the at least one beam determined by the receiving device may further include a beam in a direction roughly opposite to the direction of the second beam. For example, the direction with the included angle greater than 0° and less than 180° from the direction of the second beam and/or the direction with the included angle greater than 180° and less than 360° from the direction of the second beam may be considered as being roughly opposite to the direction of the second beam.

Figure 10B:
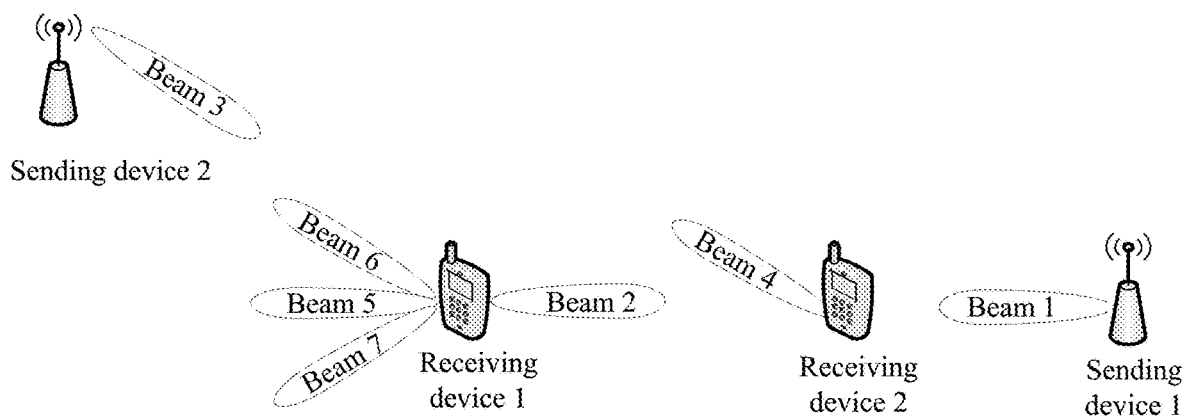
FIG. 10B is a schematic diagram of performing transmission in a second application scenario according to a second method for sending a resource reservation message according to an embodiment of this application.

As shown in FIG. 10B, for example, the at least one beam determined by the receiving device includes a beam 5, a beam 6, and a beam 7. The beam 5 is a beam in a direction with an included angle of 180° from the direction of the second beam, namely, the first beam. The beam 6 is a beam in a direction with an included angle less than 180° from the direction of the second beam. The beam 7 is a beam in a direction with an included angle greater than 180° from the direction of the second beam. In this case, a receiving device 1 not only sends an RRS in a direction of the beam 5, but also sends the RRS on the beam 6 and the beam 7. The beam 6 and the beam 7 are adjacent to the beam 5 in directions. In this way, a device (for example, a sending device 2 in FIG. 10B) in a specific range around the direction of the beam 5 can receive the RRS sent by the receiving device 1, thereby achieving an objective of suppressing transmission of the device.

In addition, the foregoing uses an example in which a beam included in the at least one beam is considered as a separate beam. For example, in FIG. 10B, the beam 5 to the beam 7 are considered as three separate beams. In addition to this manner of understanding, the at least one beam may also be considered as a wide beam in this embodiment. For example, the beam 5 to the beam 7 in FIG. 10B may be considered as one wide beam. The receiving device may transmit the RRQ by using the wide beam. In this embodiment, if a beam included in the at least one beam is considered as a separate beam, each of the at least one beam may have a same angular width that may be equal to an angular width of the second beam. Certainly, each of the at least one beam may alternatively have a different angular width, and some beams may have a same angular width as the second beam, or none of the at least one beam has a same angular width as the second beam. An angular width of each of the at least one beam may be predefined by a standard, or may be determined by the sending device itself, or may be stipulated as being related to the angular width of the second beam, for example, may be obtained based on the angular width of the second beam. This is not specifically limited. However, if the at least one beam is considered as a wide beam, an angular width of the wide beam may be greater than the angular width of the second beam. The angular width of the wide beam may be predefined by a standard, or may be determined by the sending device itself, or may be stipulated as being related to the angular width of the second beam, for example, may be obtained based on the angular width of the second beam. This is not specifically limited.

After determining the at least one beam, the receiving device may send the resource reservation response message by using the at least one beam. The resource reservation response message is, for example, an RRS. In this case, all devices located in the direction of the at least one beam can receive the RRS sent by the receiving device. For a case in which each beam included in the at least one beam is considered as a separate beam, the receiving device may send the RRS by using each of the at least one beam at the same time. This can improve transmission efficiency, but imposes a relatively high requirement on a hardware facility of the receiving device. Alternatively, the receiving device may send the RRS by using each of the at least one beam at different time. For example, the receiving device first sends the RRS by using one of the at least one beam, and after sending by using the beam is completed, sends the RRS by using another one of the at least one beam. This manner requires a relatively long transmission time, but imposes a relatively low requirement on the hardware facility of the receiving device and helps reduce costs. A specific sending manner in which the receiving device sends the resource reservation response message by using the at least one beam may be predefined by a protocol or may be selected by the receiving device itself, or specific sending manners may be fixed for different devices. This is not limited in this embodiment.

After receiving the RRS sent by the receiving device, a device in the direction of the at least one beam knows that the receiving device is to transmit data. In this case, the device in the direction of the at least one beam no longer performs transmission in a specific period of time, thereby reducing a possibility of a data reception failure of the receiving device due to transmission of the device in the direction of the at least one beam. This reduces a waste of resources and also improves a data transmission success rate. It can be considered that for the device in the direction of the at least one beam, the receiving device is no longer a hidden node, thereby eliminating a hidden node.

In addition, in this embodiment, in addition to sending the resource reservation response message by using the at least one beam, the receiving device may further send the resource reservation response message by using the second beam. In other words, the receiving device may choose to send the resource reservation response message by using the at least one beam, or may choose to send the resource reservation response message by using the at least one beam and the second beam. Certainly, the receiving device may alternatively choose to send the resource reservation response message by using only the second beam. The receiving device sends the resource reservation response message by using the second beam, so that a sending device corresponding to the receiving device may receive the resource reservation response message, and determine that data can be sent to the receiving device. The sending device corresponding to the receiving device is a device that needs to send data to the receiving device. Using FIG. 4 as an example, if the receiving device is the receiving device 1, a sending device corresponding to the receiving device 1 is the sending device 1 in FIG. 4.

If the sending device sends the resource reservation response message by using the at least one beam and the second beam and the resource reservation response message is, for example, an RRS, the sending device may send the RRS by using the second beam and each of the at least one beam at the same time. This can improve transmission efficiency, but imposes a relatively high requirement on a hardware facility of the receiving device. Alternatively, the receiving device may send the RRS by using the at least one beam and the second beam at different time. For example, the receiving device first sends the RRS by using one of the at least one beam; after sending by using the beam is completed, sends the RRS by using another one of the at least one beam, and so on; and after all sending by using the at least one beam is completed, sends the RRS by using the second beam. Alternatively, the receiving device first sends the RRS by using the second beam; after sending by using the second beam is completed, first sends the RRS by using one of the at least one beam; and after sending by using the beam is completed, sends the RRQ by using another one of the at least one beam, and so on. This manner requires a relatively long transmission time, but imposes a relatively low requirement on the hardware facility of the receiving device and helps reduce costs. Specifically, if the receiving device sends the resource reservation response message by using the at least one beam and the second beam, a sending manner used by the receiving device may be predefined by a protocol or may be selected by the receiving device itself, or specific sending manners may be fixed for different devices. This is not limited in this embodiment.

FIG. 8 shows an example in which the receiving device sends the resource reservation response message by using the at least one beam. A third device may be a device that can receive the resource reservation response message sent by the receiving device by using one of the at least one beam. A fourth device may also be a device that can receive the resource reservation response message sent by the receiving device by using one of the at least one beam. One of beams corresponding to the third device and the fourth device may be the first beam, and the other one is one of the at least one beam other than the first beam. Alternatively, neither of the beams corresponding to the third device and the fourth device is the first beam, but both are two of the at least one beam other than the first beam. In addition, FIG. 8 merely shows an example in which the two devices can receive the resource reservation response message sent by the receiving device by using the at least one beam. In actual application, a quantity of devices that can receive the resource reservation response message is not limited. Alternatively, the third device may be the sending device in operation S81. In this case, in FIG. 8, the resource reservation response message sent by the receiving device to the third device may be alternatively sent by using the second beam.

After the receiving device sends the resource reservation response message, the sending device in S81 may send data to the receiving device, and the receiving device can properly receive the data. The receiving device sends the resource reservation response message by using the at least one beam, thereby suppressing transmission of a surrounding device. Therefore, in a process of receiving the data by the receiving device, a probability of interference from another device is reduced, and a data transmission success rate of the device is improved.

Alternatively, the embodiment shown in FIG. 8 may be understood as follows:

receiving, by a receiving device in a direction of a third beam, a resource reservation request message sent by a sending device;

determining, by the receiving device, a second direction, where the second direction includes at least the direction of the third beam and a direction of a fourth beam, and the fourth beam is a beam in a direction opposite to the direction of the third beam; and sending, by the receiving device, a resource reservation response message in the second direction.

That is, in operation S81, the receiving device may receive, on the third beam, the resource reservation request message sent by the sending device. Determining at least one beam by the receiving device may also be understood as determining the second direction by the receiving device, and the direction of the first beam in the at least one beam may be understood as the direction of the third beam that is included in the second direction. Alternatively, because different embodiments do not collide with each other, the second direction herein may also be referred to as a first direction, the third beam herein may also be referred to as a second beam, and the fourth beam herein may also be referred to as a first beam. In this case, the receiving device receives, in a direction of the second beam, the resource reservation request message sent by the sending device; the receiving device determines the first direction, where the first direction includes at least the direction of the second beam and a direction of the first beam, and the first beam is a beam in a direction opposite to the direction of the second beam; and the receiving device sends the resource reservation response message in the first direction.

Figure 9:
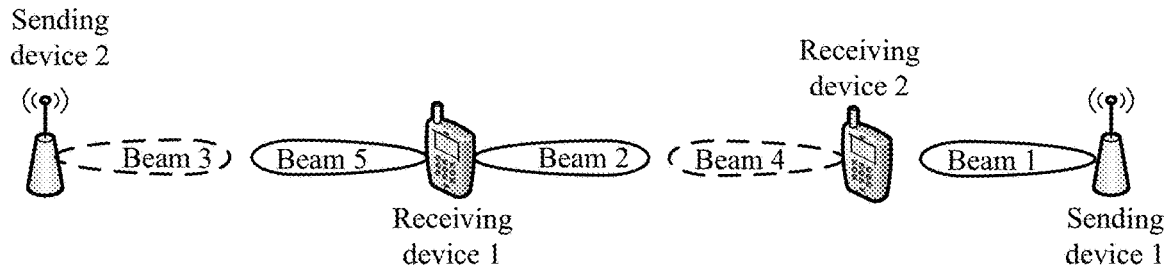
FIG. 9 is a schematic diagram of performing transmission in a second application scenario according to a second method for sending a resource reservation message according to an embodiment of this application.

When sending an RRS, a receiving device 1 performs sending in the first direction. The first direction includes at least a direction of a beam 5, as shown in FIG. 9. The direction of the beam 5 is opposite to a direction of a beam 2. The direction of the beam 2 is a potential transmission direction of the receiving device 1. That is, the beam 2 is the second beam, and the beam 5 is the first beam. In an implementation, the first direction includes only the direction of the beam 5. That is, the at least one beam determined by the receiving device includes only the first beam, and the receiving device 1 performs sending only in the direction of the beam 5, but does not perform sending in the direction of the beam 2. In another implementation, the first direction includes the direction of the beam 2 and the direction of the beam 5. In this case, the receiving device 1 performs sending in both the directions of the beam 2 and the beam 5. Specifically, the receiving device 1 may simultaneously send an RRS in the directions of the beam 2 and the beam 5. This imposes a relatively high requirement on hardware of the receiving device 2. Alternatively, the receiving device 1 may sequentially send an RRS in the directions of the two beams. For example, the receiving device 1 first performs sending in the direction of the beam 2, and then performs sending in the direction of the beam 5. This imposes a relatively low requirement on the hardware of the receiving device 1, and helps reduce costs. In this embodiment, a width of the potential transmission direction (for example, the direction of the beam 2) may be equal to a width of the first direction (for example, the direction of the beam 5), that is, a width of the second beam may be equal to a width of each of the at least one beam. Alternatively, the width of the second beam is different from the width of each of the at least one beam. Alternatively, the width of the second beam is equal to a width of some of the at least one beam.

After sending the resource reservation request message in the first direction, the receiving device may further receive, in the direction of the second beam, data sent by the sending device.

Likewise, considering non-ideality of a component, namely, the problem shown in FIG. 10A, the receiving device sends the RRS in the first direction, where the first direction includes a direction opposite to the potential transmission direction of the receiving device. In this embodiment, "the direction opposite to the potential transmission direction of the receiving device" not only includes a direction of a beam (which may also be referred to as a reverse beam of the receiving device, namely, the first beam) opposite to a direction of a potential transmission beam of the receiving device, but also includes a direction of a beam around the reverse beam. In other words, in addition to the direction of the first beam, the first direction further includes a direction in a predefined range around the first beam. That is, the at least one beam determined by the receiving device not only includes the first beam, but also may include a beam in a direction with an included angle less than 180° from the direction of the second beam and/or a beam in a direction with an included angle greater than 180° from the direction of the second beam. As shown in FIG. 10B, the receiving device 1 not only sends the RRS in the direction of the beam 5, but also sends the RRS on the directions of the beam 6 and the beam 7. The beam 6 and the beam 7 are adjacent to the beam 5 in directions. In this way, a device (for example, the sending device 2) in a specific range around the direction of the beam 5 can receive the RRS sent by the receiving device 1, thereby achieving an objective of suppressing transmission of the device. Similar to the case shown in FIG. 9, the receiving device 1 may or may not send the RRS in the direction of the beam 2. The receiving device 1 may simultaneously send the RRS in the direction of the beam 2 (if sending is performed) and the directions of the beam 5 to the beam 7. This imposes a relatively high requirement on the hardware of the receiving device 1. Alternatively, the receiving device 1 may sequentially send the RRS in the directions of these beams. For example, the receiving device 1 first performs sending in the direction of the beam 2, and then sequentially performs sending in the directions of the beam 5 to the beam 7. In addition, the directions of the beam 5 to the beam 7 may be alternatively combined, and the beam 5 to the beam 7 are considered as one wide beam. The RRS is transmitted by using the wide beam. In this embodiment, an angular width of the potential transmission direction (for example, the beam 2) may be less than an angular width of the beam 5 to the beam 7. A specific value of an angular width of the first direction may be predefined by a standard, or may be determined by the receiving device, or may be a function of the potential transmission direction.

The embodiment shown in FIG. 8 describes a method for resolving the problem existing in the scenario shown in FIG. 4. However, a solution for the scenario shown in FIG. 4 is not limited to that provided in the embodiment shown in FIG. 8. The following further describes another embodiment. The embodiment may also be used to resolve the problem existing in the scenario shown in FIG. 4.

Figure 11:
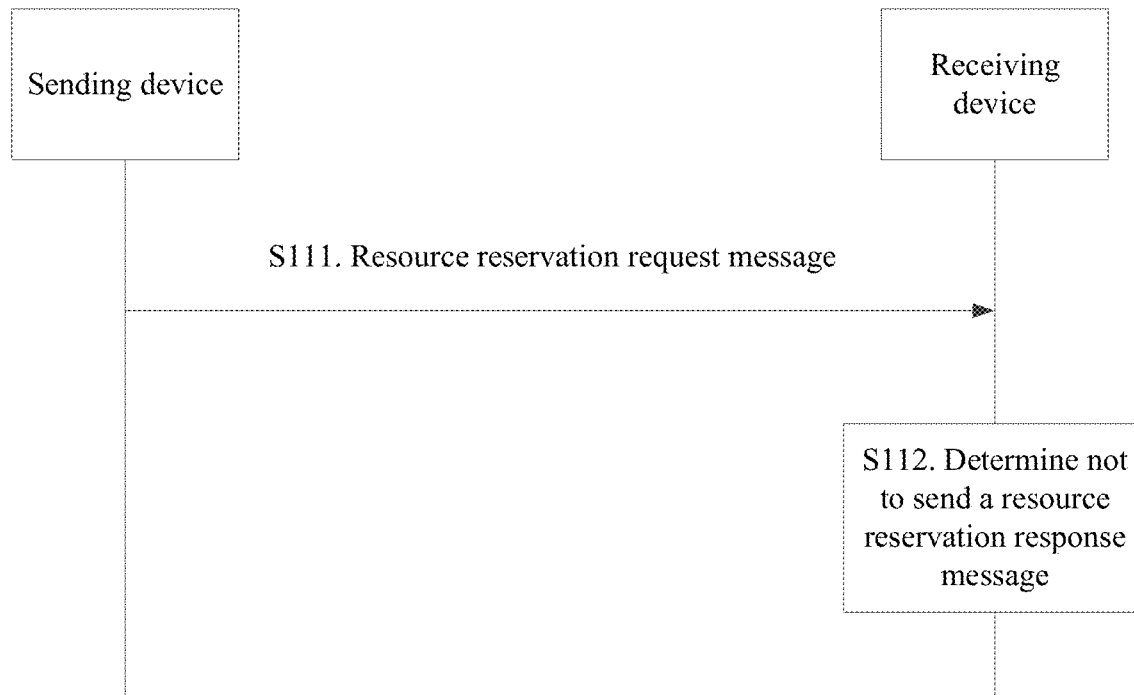
FIG. 11 is a flowchart of a third method for sending a resource reservation message according to an embodiment of this application.

Referring to FIG. 11, an embodiment of this application provides a third method for sending a resource reservation message. The method may also be used to resolve the technical problem existing in the scenario shown in FIG. 4. The method may be performed by a communications apparatus. In this embodiment, the communications apparatus is used as a receiving device. Therefore, this may also be understood as that the method may be performed by a sending device and a communications apparatus. Certainly, the sending device may also be understood as a type of communications apparatus. Therefore, this may also be understood as that the method is performed by a communications apparatus used as a sending device and a communications apparatus used as a receiving device. A procedure of the method is described as follows:

S111. A sending device sends a resource reservation request message to a receiving device, and the receiving device receives the resource reservation request message from the sending device.

S112. The receiving device determines not to send a resource reservation response message, where the resource reservation response message is used to determine to reserve a transmission resource.

In this embodiment, a resource reservation message includes the resource reservation response message used to determine to reserve a transmission resource.

The receiving device in this embodiment is, for example, the receiving device 2 in the scenario shown in FIG. 4, or certainly, may be the receiving device 1 in the scenario shown in FIG. 4. This is not limited in this embodiment. Alternatively, this embodiment may be applied to another scenario, for example, may be applied to the scenario shown in FIG. 3. In this case, the receiving device in this embodiment is, for example, the receiving device 1 or the receiving device 2 in the scenario shown in FIG. 3.

That the receiving device does not send a resource reservation response message includes but is not limited to the following two cases. An example in which the resource reservation request message is an RRQ and the resource reservation response message is an RRS is used in the following description process.

1. First Case

In this case, the sending device may indicate, by using a sent RRQ, to the receiving device that, for example, no RRS needs to be returned. Alternatively, a protocol may be used to specify that the receiving device does not need to return a resource reservation response message after receiving the resource reservation request message.

Usually, the first case is relatively applicable to a scenario in which a sending device is relatively close to a receiving device, especially a scenario in which transmit power of a sending device sending an RRQ is greater than that of a receiving device.

2. Second Case

The receiving device receives the RRQ, and if the receiving device determines that a count value of a resource reservation timer maintained by the receiving device is greater than 0, the receiving device chooses not to send an RRS. Alternatively, the receiving device may receive data, and if the receiving device determines that a count value of a resource reservation timer maintained by the receiving device is greater than 0, the receiving device chooses not to send a HARQ-ACK for the received data. An implementation form of the resource reservation timer is the NAV described above.

Using an example in which the receiving device is the receiving device 2 in the scenario shown in FIG. 4, in the second case, when the receiving device 2 receives an RRQ or data from a sending device 2, because a resource reservation timer of the receiving device 2 has been set by an RRS from a receiving device 1 before (that is, a count value of the resource reservation timer of the receiving device 2 is greater than 0), the receiving device 2 does not send an RRS, and therefore does not interfere with reception of the receiving device 1 on a beam 2.

In the first case, after sending the RRQ, the sending device continues to send data. In the second case, when the sending device receives no HARQ-ACK/RRS after sending data or an RRQ, the sending device should re-contend for a channel, and then re-send data or an RRQ.

In the embodiment shown in FIG. 8, the receiving device sends the resource reservation response message on the at least one beam, thereby achieving an objective of suppressing transmission of a device in the direction of the at least one beam, and improving a transmission success rate of the receiving device. According to the foregoing analysis of the scenario shown in FIG. 4, it can be learned that a main cause is that the RRS message sent by the receiving device 2 affects reception of the receiving device 1. Therefore, in this embodiment, the receiving device may not return a resource reservation response message after receiving the resource reservation request message. This manner can prevent a resource reservation response message sent by the receiving device from affecting transmission of another device, and improve a transmission success probability of the another device.

According to the foregoing descriptions of the embodiment shown in FIG. 5, the embodiment shown in FIG. 8, and the embodiment shown in FIG. 11, it can be learned that the sending device may send the resource reservation request message in three optional sending manners. A sending manner 1 is sending by using only the second beam. A sending manner 2 is sending by using only the at least one beam. A sending manner 3 is sending by using the second beam and the at least one beam. After receiving the resource reservation request message, the receiving device has four optional processing manners. A processing manner 1 is sending a resource reservation response message by the receiving device by using only the third beam (herein, to distinguish between the receiving device and the sending device, the second beam corresponding to the receiving device is referred to as the third beam instead, but actually, the third beam herein has a same feature as the second beam in the embodiment shown in FIG. 8). A processing manner 2 is sending a resource reservation request message by the receiving device by using only the at least one beam. A processing manner 3 is sending a resource reservation request message by the receiving device by using the third beam and the at least one beam. A processing manner 4 is skipping sending a resource reservation request message by the receiving device.

In this case, which one of the foregoing sending manners is specifically used by the sending device to send the resource reservation request message may be predefined by a standard, or may be configured by a network device such as a base station. Likewise, which one of the foregoing four processing manners is specifically used by the receiving device for responding after receiving the resource reservation request message may be predefined by a standard, or may be configured by a network device such as a base station. For the sending device and the receiving device, the foregoing three sending manners of the sending device and the foregoing four processing manners of the receiving device may be randomly combined. For example, a standard may specify, through predefinition, that the sending device sends the resource reservation request message in any one of the foregoing three sending manners, and may further specify, through predefinition, that the receiving device responds to the received resource reservation request message in any one of the foregoing four processing manners. That is, a sending manner used by the sending device and a processing manner used by the receiving device are not limited in this embodiment of this application.

In other words, to sum up, the sending device may specifically send the RRQ in the first direction in the following two possible sending manners:

Sending manner 1: The first direction includes only a direction opposite to the potential transmission direction of the sending device, that is, the first direction includes only the direction of the at least one beam in the embodiment shown in FIG. 5. In this case, the sending device does not send the RRQ in the potential transmission direction, that is, does not send the RRQ in the direction of the second beam.

Alternatively, sending manner 2: The first direction includes both a direction opposite to the potential transmission direction of the sending device, and the potential transmission direction, that is, the first direction includes the direction of the second beam and the direction of the at least one beam. In this case, the sending device performs sending in both the directions. The performing sending in both the directions may be performed at the same time, or may be sequentially performed at different time.

Which one of the foregoing sending manners is specifically used by the sending device to send the RRQ may be predefined by a standard, or may be configured by a network device such as a base station.

When a receiving device receives the RRQ sent to the receiving device, the receiving device may have the following several possible processing manners:

Processing manner 1: The receiving device does not send an RRS, but waits for the sending device to send data. The RRQ in this case is similar to CTS-to-Self in 802.11, and when receiving the RRQ, the receiving device should know that no RRS needs to be returned. For example, the RRQ indicates that no RRS needs to be returned. Such an RRQ that does not require an RRS is usually applicable to a case in which a receiving device is relatively close to a sending device, especially a case in which transmit power of a sending device sending an RRQ is greater than that of a receiving device.

Alternatively, processing manner 2: The receiving device returns an RRS in the first direction, and the first direction includes only the potential transmission direction of the receiving device (that is, a direction pointing from the receiving device to the sending device), that is, the first direction includes only the direction of the second beam in the embodiment shown in FIG. 8. In this case, the receiving device returns the RRS only in the potential transmission direction.

Alternatively, processing manner 3: The receiving device returns an RRS in the first direction, and the first direction includes both the potential transmission direction of the receiving device and a direction opposite to the potential transmission direction, that is, the first direction includes the direction of the second beam and the direction of the at least one beam in the embodiment shown in FIG. 8. In this case, the receiving device sends the RRS in both the directions. The performing sending in both the directions may be performed at the same time, or may be sequentially performed at different time.

Alternatively, processing manner 4: After receiving the RRQ, if the receiving device determines that a count value of a resource reservation timer maintained by the receiving device is greater than 0, the receiving device chooses not to send an RRS. That is, the following stipulation is predefined: When a device whose resource reservation timer is greater than 0 receives a message (for example, an RRQ or data) destined for the device, the device does not immediately contend for a channel or return a response message (for example, an RRS or a HARQ ACK). For example, the foregoing stipulation is defined in an NR-U standard. Using FIG. 4 as an example, when the receiving device 2 receives an RRQ or data from the sending device 2, because a resource reservation timer of the receiving device 2 has been set by an RRS from the receiving device 2 before (that is, the resource reservation timer of the receiving device 2 is 0), the receiving device 2 does not return a resource reservation response message, and therefore does not interfere with reception of the receiving device 1 on a beam 2.

Which one of the foregoing four processing manners is used by the receiving device for responding after receiving the RRQ sent to the receiving device may be predefined by a standard, or may be configured by a network device, for example, a base station.

The following describes an apparatus provided in the embodiments of this application with reference to the accompanying drawings.

Figure 12:
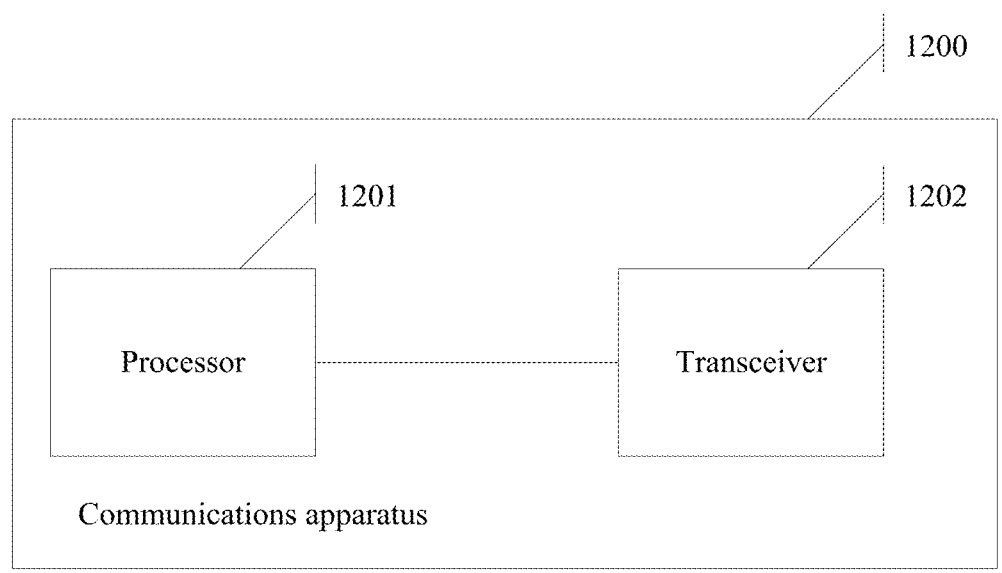
FIG. 12 is a schematic structural diagram of a communications apparatus according to an embodiment of this application.

FIG. 12 is a schematic structural diagram of a communications apparatus 1200. The communications apparatus 1200 can implement functions of the sending device or the receiving device included in the foregoing descriptions. The communications apparatus 1200 may be the sending device in the foregoing descriptions, or may be a chip or another component disposed in the sending device in the foregoing descriptions, or may be the receiving device in the foregoing descriptions, or may be a chip or another component disposed in the receiving device in the foregoing descriptions. The communications apparatus 1200 may be a network device such as a base station or an access point (access point, AP), or may be a terminal device, or may be a chip disposed in a network device or a terminal device. The communications apparatus 1200 may include a processor 1201 and a transceiver 1202. For example, the transceiver 1202 may be implemented by a radio frequency transceiver. The communications apparatus 1200 includes one or more processors 1201. The processor 1201 may be configured to perform operation S51 in the embodiment shown in FIG. 5, and/or configured to support another process of the technologies described in this specification, and the transceiver 1202 may be configured to perform operation S52 in the embodiment shown in FIG. 5, and/or configured to support another process of the technologies described in this specification. Alternatively, the processor 1201 may be configured to perform operation S82 in the embodiment shown in FIG. 8, and/or configured to support another process of the technologies described in this specification, and the transceiver 1202 may be configured to perform operations S81 and S83 in the embodiment shown in FIG. 8, and/or configured to support another process of the technologies described in this specification. Alternatively, the processor 1201 may be configured to perform operation S112 in the embodiment shown in FIG. 8, and/or configured to support another process of the technologies described in this specification, and the transceiver 1202 may be configured to perform operation S111 in the embodiment shown in FIG. 8, and/or configured to support another process of the technologies described in this specification. The transceiver 1202 may be understood as an integrated structure configured to implement a sending/receiving function, or may be understood as including two structures referred to as a transmitter and a receiver. The transmitter is configured to implement a function of sending information or sending data. The receiver is configured to implement a function of receiving information or receiving data.

For example, the processor 1201 is configured to determine at least one beam to be used for sending a resource reservation message, where the at least one beam includes a first beam, a direction of the first beam is opposite to a direction of a second beam, and the direction of the second beam is a potential transmission direction in which the communications apparatus sends information; and the transceiver 1202 is configured to send the resource reservation message by using the at least one beam, where the resource reservation message includes a resource reservation request message or a resource reservation response message, the resource reservation request message is used to request to reserve a transmission resource, and the resource reservation response message is used to determine to reserve a transmission resource.

For function descriptions of corresponding functional modules, refer to all related content of the operations included in the foregoing method embodiments. Details are not described herein again.

Figure 13A:
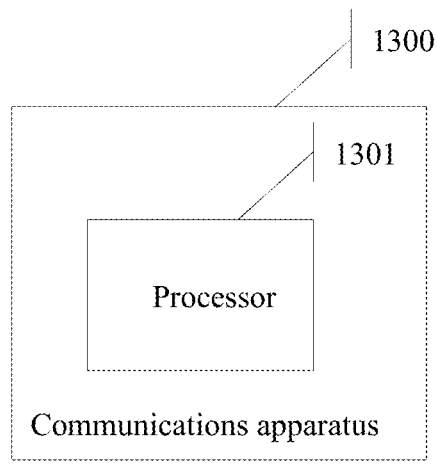
FIG. 13A and FIG. 13B are two schematic structural diagrams of a communications apparatus according to an embodiment of this application.

In a simple embodiment, a person skilled in the art may figure out that the communications apparatus 1200 may be alternatively implemented by using a structure of a communications apparatus 1300 shown in FIG. 13A. The communications apparatus 1300 can implement functions of the network device or the terminal device included in the foregoing descriptions. The communications apparatus 1300 may include a processor 1301. The communications apparatus 1300 includes one or more processors 1301.

When the communications apparatus 1300 is configured to implement functions of the sending device in the embodiment shown in FIG. 5, the processor 1301 may be configured to perform operation S51 in the embodiment shown in FIG. 5, and/or configured to support another process of the technologies described in this specification. When the communications apparatus 1300 is configured to implement functions of the receiving device in the embodiment shown in FIG. 8, the processor 1301 may be configured to perform operation S82 in the embodiment shown in FIG. 8, and/or configured to support another process of the technologies described in this specification. When the communications apparatus 1300 is configured to implement functions of the receiving device in the embodiment shown in FIG. 11, the processor 1301 may be configured to perform operation S112 in the embodiment shown in FIG. 11, and/or configured to support another process of the technologies described in this specification.

The communications apparatus 1300 may be implemented by a field-programmable gate array (field-programmable gate array, FPGA), an application-specific integrated circuit (application-specific integrated circuit, ASIC), a system on chip (system on chip, SoC), a central processing unit (central processor unit, CPU), a network processor (network processor, NP), a digital signal processing circuit (digital signal processor, DSP), or a micro controller (micro controller unit, MCU), or may be implemented by a programmable controller (programmable logic device, PLD) or another integrated chip. In this case, the communications apparatus 600 may be disposed in a network device or a communications device in the embodiments of this application, so that the network device or the communications device implements the message transmission method provided in the embodiments of this application.

In one embodiment, the communications apparatus 1300 may include a transceiver component configured to communicate with another device. The transceiver component may also be understood as a communications unit. The communications unit may be, for example, an input/output interface, a pin, or a circuit. For example, when the communications apparatus 1300 is configured to implement functions of the sending device in the embodiment shown in FIG. 5, the transceiver component may be configured to perform operation S52 in the embodiment shown in FIG. 5, and/or configured to support another process of the technologies described in this specification. When the communications apparatus 1300 is configured to implement functions of the receiving device in the embodiment shown in FIG. 8, the transceiver component may be configured to perform operations S81 and S83 in the embodiment shown in FIG. 8, and/or configured to support another process of the technologies described in this specification. When the communications apparatus 1300 is configured to implement functions of the receiving device in the embodiment shown in FIG. 11, the transceiver component may be configured to perform operation S111 in the embodiment shown in FIG. 11, and/or configured to support another process of the technologies described in this specification.

Figure 13B:
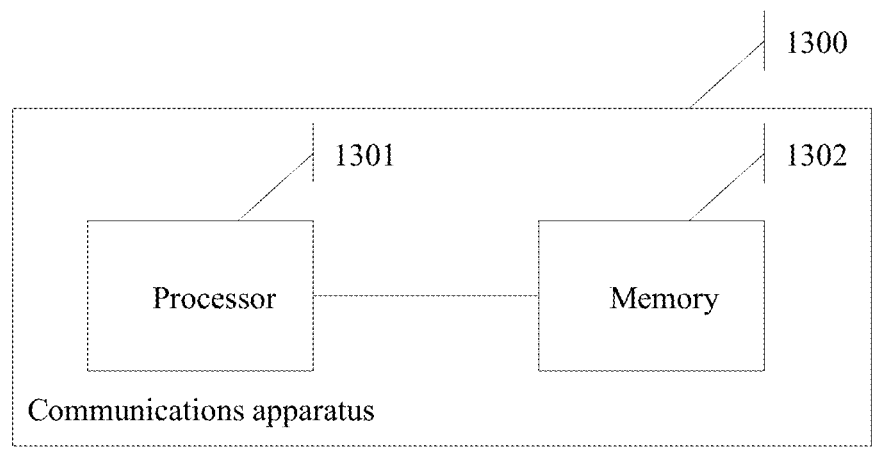

In one embodiment the communications apparatus 1300 may further include a memory 1302, as shown in FIG. 13B. The memory 1302 is configured to store a computer program or an instruction. The processor 1301 is configured to decode and execute the computer program or the instruction. The memory 1302 may be a storage unit in the communications apparatus 1300, for example, a register or a cache. Alternatively, the memory 1302 may be a storage unit inside a device in which the communications apparatus 1300 is located, but outside the communications apparatus 1300, for example, a read-only memory (read-only memory, ROM), another type of static storage device that can store static information and an instruction, or a random access memory (random access memory, RAM). It should be understood that the computer program or the instruction may include a functional program of the foregoing sending device or receiving device. When the functional program of the sending device is decoded and executed by the processor 1301, the sending device may be enabled to implement functions of the sending device in the method provided in the embodiment shown in FIG. 5, the embodiment shown in FIG. 8, or the embodiment shown in FIG. 11. When the functional program of the receiving device is decoded and executed by the processor 1301, the receiving device may be enabled to implement functions of the receiving device in the method provided in the embodiment shown in FIG. 5, the embodiment shown in FIG. 8, or the embodiment shown in FIG. 11.

In another optional implementation, the functional program of the sending device or the receiving device is stored in an external memory of the communications apparatus 1300. When the functional program of the sending device is decoded and executed by the processor 1301, the memory 1302 temporarily stores some or all content of the functional program of the sending device. When the functional program of the receiving device is decoded and executed by the processor 1301, the memory 1302 temporarily stores some or all content of the functional program of the receiving device.

In another optional implementation, the functional program of the sending device or the receiving device is configured as being stored in the internal memory 1302 of the communications apparatus 1300. When the internal memory 1302 of the communications apparatus 1300 stores the functional program of the sending device, the communications apparatus 1300 may be disposed in the sending device in the embodiments of this application. When the internal memory 1302 of the communications apparatus 1300 stores the functional program of the receiving device, the communications apparatus 1300 may be disposed in the receiving device in the embodiments of this application.

In still another optional implementation, some content of the functional program of the sending device is stored in an external memory of the communications apparatus 1300, and other content of the functional program of the sending device is stored in the internal memory 1302 of the communications apparatus 1300. Alternatively, some content of the functional program of the receiving device is stored in an external memory of the communications apparatus 1300, and other content of the functional program of the receiving device is stored in the internal memory 1302 of the communications apparatus 1300.

In the foregoing embodiments, the transceiver (or the transceiver component) is used for specific signal sending/receiving. The processor is configured to control the transceiver (or the transceiver component) to perform signal sending/receiving, and perform another processing function. Therefore, the transceiver (or the transceiver component) is equivalent to an entity for performing air-interface signal sending/receiving, and the processor is an entity for controlling the air-interface signal sending/receiving, and is configured to schedule or control the transceiver (or the transceiver component) to implement sending/receiving. Driven by a software program or an instruction in the memory, the processor controls the transceiver (or the transceiver component) to work, so as to implement sending/receiving of various signals and jointly implement the procedure of any one of the foregoing method embodiments. Therefore, one or all of the processor and the transceiver (or the transceiver component) may be considered as being capable of performing an air-interface sending/receiving action.

In this embodiment of this application, the communications apparatus 1200 and the communications apparatus 1300 are presented by dividing functional modules based on functions, or may be presented by dividing functional modules through integration. Herein, the "module" may be an ASIC, a processor that executes one or more software or firmware programs and a memory, an integrated logic circuit, and/or another component that can provide the foregoing functions.

In addition, the communications apparatus 1200 provided in the embodiment shown in FIG. 12 may be alternatively implemented in another form. For example, the communications apparatus includes a processing module and a transceiver module. For example, the processing module may be implemented by the processor 1201, and the transceiver module may be implemented by the transceiver 1202. The processing module may be configured to perform operation S51 in the embodiment shown in FIG. 5, and/or configured to support another process of the technologies described in this specification, and the transceiver module may be configured to perform operation S52 in the embodiment shown in FIG. 5, and/or configured to support another process of the technologies described in this specification. Alternatively, the processing module may be configured to perform operation S82 in the embodiment shown in FIG. 8, and/or configured to support another process of the technologies described in this specification, and the transceiver module may be configured to perform operations S81 and S83 in the embodiment shown in FIG. 8, and/or configured to support another process of the technologies described in this specification. Alternatively, the processing module may be configured to perform operation S112 in the embodiment shown in FIG. 8, and/or configured to support another process of the technologies described in this specification, and the transceiver module may be configured to perform operation S111 in the embodiment shown in FIG. 8, and/or configured to support another process of the technologies described in this specification.

For example, the processing module is configured to determine at least one beam to be used for sending a resource reservation message, where the at least one beam includes a first beam, a direction of the first beam is opposite to a direction of a second beam, and the direction of the second beam is a potential transmission direction in which the communications apparatus sends information; and a transceiver module, configured to send the resource reservation message by using the at least one beam, where the resource reservation message includes a resource reservation request message or a resource reservation response message, the resource reservation request message is used to request to reserve a transmission resource, and the resource reservation response message is used to determine to reserve a transmission resource.

For function descriptions of corresponding functional modules, refer to all related content of the operations included in the foregoing method embodiments. Details are not described herein again.

The communications apparatus 1200 and the communications apparatus 1300 provided in this embodiment of this application may be configured to perform the method provided in the embodiment shown in FIG. 5, the embodiment shown in FIG. 8, or the embodiment shown in FIG. 11. Therefore, for technical effects that can be achieved by the communications apparatus 1200 and the communications apparatus 1300, refer to the foregoing method embodiments. Details are not described herein again.

The embodiments of this application are described with reference to the flowcharts and/or block diagrams of the method, the device (system), and the computer program product according to the embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

All or some of the foregoing embodiments may be implemented by using software, hardware, firmware, or any combination thereof When software is used to implement the embodiments, the embodiments may be implemented completely or partially in a form of a computer program product. The computer program product includes one or more computer instructions. When the computer program instructions are loaded and executed on the computer, the procedure or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (digital subscriber line, DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital versatile disc (digital versatile disc, DVD)), a semiconductor medium (for example, a solid-state drive (solid state disk, SSD)), or the like.

Obviously, a person skilled in the art can make various modifications and variations to embodiments of this application without departing from the spirit and scope of this application. This application is intended to cover these modifications and variations provided that they fall within the scope of protection defined by the following claims and their equivalent technologies.

What is claimed is:

1. A method for sending a resource reservation message, comprising:
    determining, by a communications apparatus, at least one beam to be used for sending a resource reservation message, wherein the at least one beam comprises a first beam, wherein a first direction of the first beam is opposite to a second direction of a second beam, and wherein the second direction of the second beam is a potential transmission direction in which the communications apparatus sends information; and
    after performing a listen before talk (LBT) operation, sending, by the communications apparatus, the resource reservation message in the first direction by using the at least one beam and in the second direction by using the second beam, wherein the resource reservation message comprises a resource reservation request message or a resource reservation response message, wherein the resource reservation request message is used to request to reserve a transmission resource, and wherein the resource reservation response message is used to determine to reserve a transmission resource.

2. The method according to claim 1, wherein the at least one beam further comprises at least one of the following beams:
    a beam in a third direction with an included angle greater than 0° and less than 180° from the second direction of the second beam; or
    a beam in a fourth direction with an included angle greater than 180° and less than 360° from the second direction of the second beam.

3. The method according to claim 2, wherein the sending, by the communications apparatus, the resource reservation message in the first direction by using the at least one beam comprises:

sending, by the communications apparatus, the resource reservation message in the first direction, the third direction, and the fourth direction by using each of the at least one beam at the same time; or sending, by the communications apparatus, the resource reservation message in the first direction, the third direction, and the fourth direction by using each of the at least one beam at a different time.

4. The method according to claim 1, wherein the communications apparatus is a sending device, wherein the resource reservation message is the resource reservation request message, and the method further comprises:

sending, by the communications apparatus, data by using the second beam after sending the resource reservation request message.

5. The method according to claim 1, wherein the communications apparatus is a receiving device, wherein the resource reservation message is the resource reservation response message, and before the determining, by a communications apparatus, the at least one beam, the method further comprises:

receiving, by the communications apparatus, the resource reservation request message from a sending device.

6. A communications apparatus, comprising:

a processor, configured to determine at least one beam to be used for sending a resource reservation message, wherein the at least one beam comprises a first beam, wherein a first direction of the first beam is opposite to a second direction of a second beam, and wherein the second direction of the second beam is a potential transmission direction in which the communications apparatus sends information; and a transceiver, configured to send, after performing a listen before talk (LBT) operation, the resource reservation message in the first direction by using the at least one beam and in the second direction by using the second beam, wherein the resource reservation message comprises a resource reservation request message or a resource reservation response message, wherein the resource reservation request message is used to request to reserve a transmission resource, and wherein the resource reservation response message is used to determine to reserve a transmission resource.

7. The communications apparatus according to claim 6, wherein the at least one beam further comprises at least one of the following beams:

a beam in a third direction with an included angle greater than 0° and less than 180° from the second direction of the second beam; or a beam in a fourth direction with an included angle greater than 180° and less than 360° from the second direction of the second beam.

8. The communications apparatus according to claim 7, wherein the transceiver is configured to:

send the resource reservation message in the first direction, the third direction, and the fourth direction by using each of the at least one beam at the same time; or send the resource reservation message in the first direction, the third direction, and the fourth direction by using each of the at least one beam at a different time.

9. The communications apparatus according to claim 8, wherein the communications apparatus is a sending device, wherein the resource reservation message is the resource reservation request message, and wherein the transceiver is further configured to:

send data by using the second beam after sending the resource reservation request message.

10. The communications apparatus according to claim 7, wherein the communications apparatus is a sending device, wherein the resource reservation message is the resource reservation request message, and wherein the transceiver is further configured to:

send data by using the second beam after sending the resource reservation request message.

11. The communications apparatus according to claim 6, wherein the communications apparatus is a sending device, wherein the resource reservation message is the resource reservation request message, and wherein the transceiver is further configured to:

send data by using the second beam after sending the resource reservation request message.

12. The communications apparatus according to claim 6, wherein the communications apparatus is a receiving device, wherein the resource reservation message is the resource reservation response message, and wherein the transceiver is further configured to:

receive the resource reservation request message from a sending device before the processor determines the at least one beam.

13. A non-transitory computer readable storage medium, wherein the medium stores an instruction, and when the instruction runs on a computer, the computer is enabled to perform operations for a communications apparatus, the operations comprising:

determining at least one beam to be used for sending a resource reservation message, wherein the at least one beam comprises a first beam, wherein a first direction of the first beam is opposite to a second direction of a second beam, and wherein the second direction of the second beam is a potential transmission direction in which the communications apparatus sends information; and after performing a listen before talk (LBT) operation, sending the resource reservation message in the first direction by using the at least one beam and in the second direction by using the second beam, wherein the resource reservation message comprises a resource reservation request message or a resource reservation response message, wherein the resource reservation request message is used to request to reserve a transmission resource, and wherein the resource reservation response message is used to determine to reserve a transmission resource.

14. The non-transitory computer readable storage medium according to claim 13, wherein the at least one beam further comprises at least one of the following beams:

a beam in a third direction with an included angle greater than 0° and less than 180° from the second direction of the second beam; or a beam in a fourth direction with an included angle greater than 180° and less than 360° from the second direction of the second beam.

15. The non-transitory computer readable storage medium according to claim 14, wherein the sending the resource reservation message in the first direction by using the at least one beam comprises:

sending the resource reservation message in the first direction, the third direction, and the fourth direction by using each of the at least one beam at the same time; or sending the resource reservation message in the first direction, the third direction, and the fourth direction by using each of the at least one beam at a different time.

16. The computer readable storage medium according to claim 14, wherein the communications apparatus is a sending device, wherein the resource reservation message is the resource reservation request message, and wherein the operations further comprise:

sending data by using the second beam after sending the resource reservation request message.

17. The non-transitory computer readable storage medium according to claim 14, wherein the communications apparatus is a receiving device, wherein the resource reservation message is the resource reservation response message, and wherein the the operations further comprise:

receiving the resource reservation request message from a sending device before determining the at least one beam.

* * * * *